(12) United States Patent
Guemmer

(10) Patent No.: US 9,797,254 B2
(45) Date of Patent: Oct. 24, 2017

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 365 days.

(21) Appl. No.: 14/626,544

(22) Filed: Feb. 19, 2015

(65) Prior Publication Data

US 2015/0240643 A1    Aug. 27, 2015

(30) Foreign Application Priority Data

Feb. 27, 2014   (DE) .................. 10 2014 203 607

(51) Int. Cl.
| | | |
|---|---|---|
| F01D 5/02 | (2006.01) | |
| F04D 29/54 | (2006.01) | |
| F04D 29/32 | (2006.01) | |
| F01D 5/14 | (2006.01) | |
| F01D 1/06 | (2006.01) | |

(52) U.S. Cl.
CPC ............. F01D 5/022 (2013.01); F01D 1/06 (2013.01); F01D 5/142 (2013.01); F01D 5/146 (2013.01); F04D 29/324 (2013.01); F04D 29/544 (2013.01); *Y02T 50/673* (2013.01)

(58) Field of Classification Search
CPC .......... F01D 5/145; F01D 5/142; F01D 5/143; F01D 5/146; F01D 9/041; F01D 5/022; F04D 29/324; F04D 29/542; F04D 29/544; F05D 2240/125; F05D 2240/24; F05D 2240/307; F05D 2240/11

See application file for complete search history.

(56) References Cited

U.S. PATENT DOCUMENTS 8,534,997 B2    9/2013   Guemmer
8,573,941 B2 *  11/2013  Hoeger .................. F01D 5/142
                                                                415/181

(Continued)

FOREIGN PATENT DOCUMENTS

DE       3924829      2/1991
DE     102007035726    2/2009

(Continued)

OTHER PUBLICATIONS

European Search Report dated Jul. 23, 2015 for related European Application No. 15156104.0.

(Continued)

*Primary Examiner* — Woody Lee, Jr.
*Assistant Examiner* — Eric Zamora Alvarez
(74) *Attorney, Agent, or Firm* — Shuttleworth & Ingersoll, PLC; Timothy Klima

(57) ABSTRACT

A blade row group arrangeable in a main flow path of a fluid-flow machine includes N adjacent member blade rows firmly arranged relative to each other in both a meridional direction (m) and a circumferential direction (u). A relative secondary passage length (v') and a relative secondary passage width (w') each increase at least in one part of the area between the mean meridional flow line (SLM) and at least one of the main flow path boundaries (HB) towards the main flow path boundary (HB).

19 Claims, 16 Drawing Sheets

(56) References Cited

U.S. PATENT DOCUMENTS

| | | | |
|---|---|---|---|
| 2010/0303629 A1* | 12/2010 | Guemmer | F01D 5/146 416/223 R |
| 2011/0318172 A1 | 12/2011 | Hoeger | |
| 2012/0148396 A1 | 6/2012 | Guemmer | |
| 2013/0209223 A1 | 8/2013 | Gomez et al. | |
| 2013/0209224 A1 | 8/2013 | Gomez et al. | |
| 2013/0209241 A1 | 8/2013 | Gomez et al. | |
| 2013/0209259 A1 | 8/2013 | Gomez et al. | |

FOREIGN PATENT DOCUMENTS

| | | |
|---|---|---|
| DE | 102009013399 | 9/2010 |
| EP | 2261463 | 12/2010 |
| EP | 2463480 | 6/2012 |
| EP | 2626514 | 8/2013 |
| GB | 2235734 | 3/1991 |

OTHER PUBLICATIONS

German Search Report dated Mar. 28, 2014 from counterpart German App No. 10 2014 203 607.0.
Willy J. G. Braunling, Aircraft Engines, ISBN 978-3-540-76368-0, Springer, pp. 604, 643, 967, 968 [See attached concise statement of relevance].

* cited by examiner

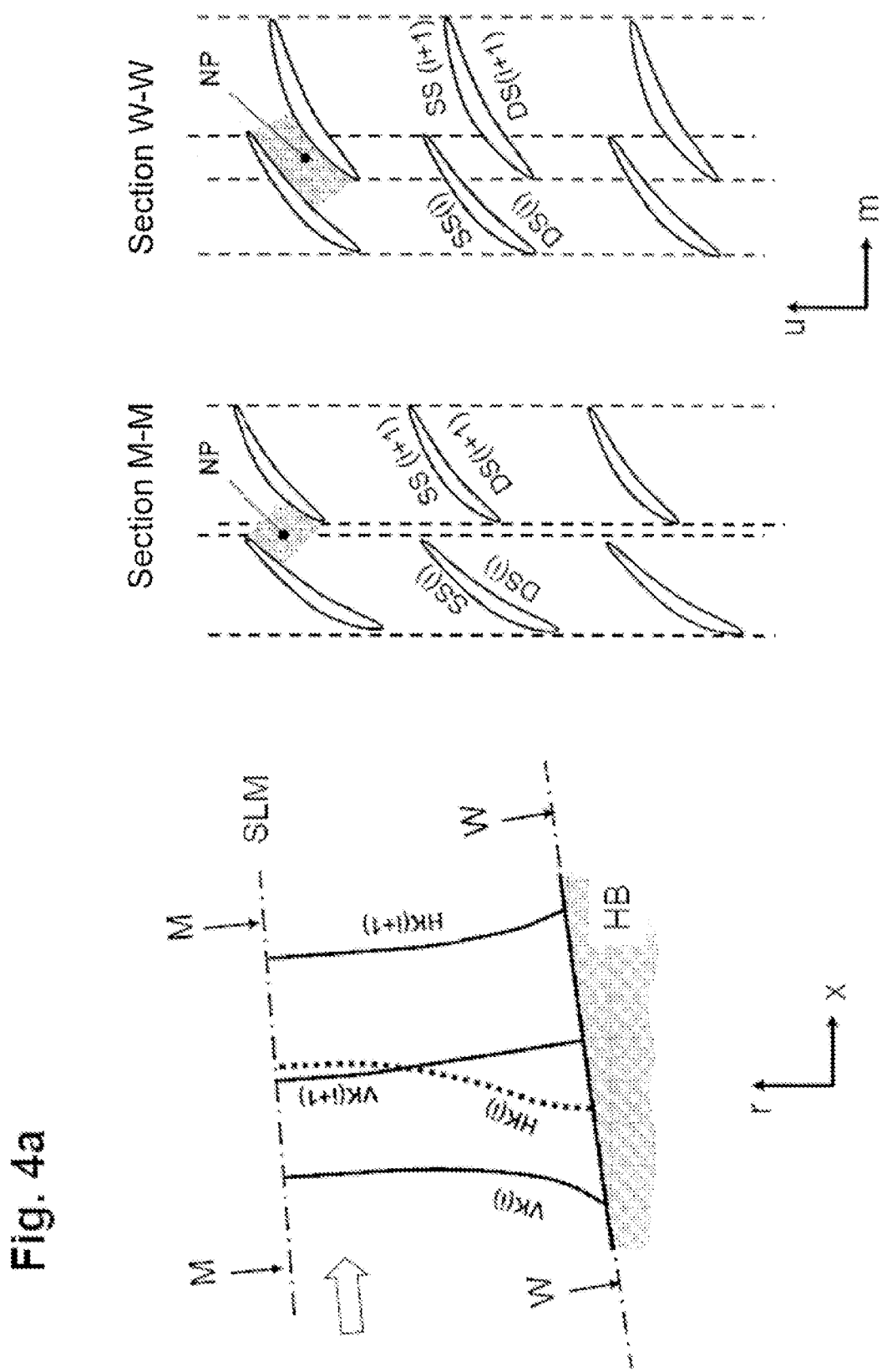

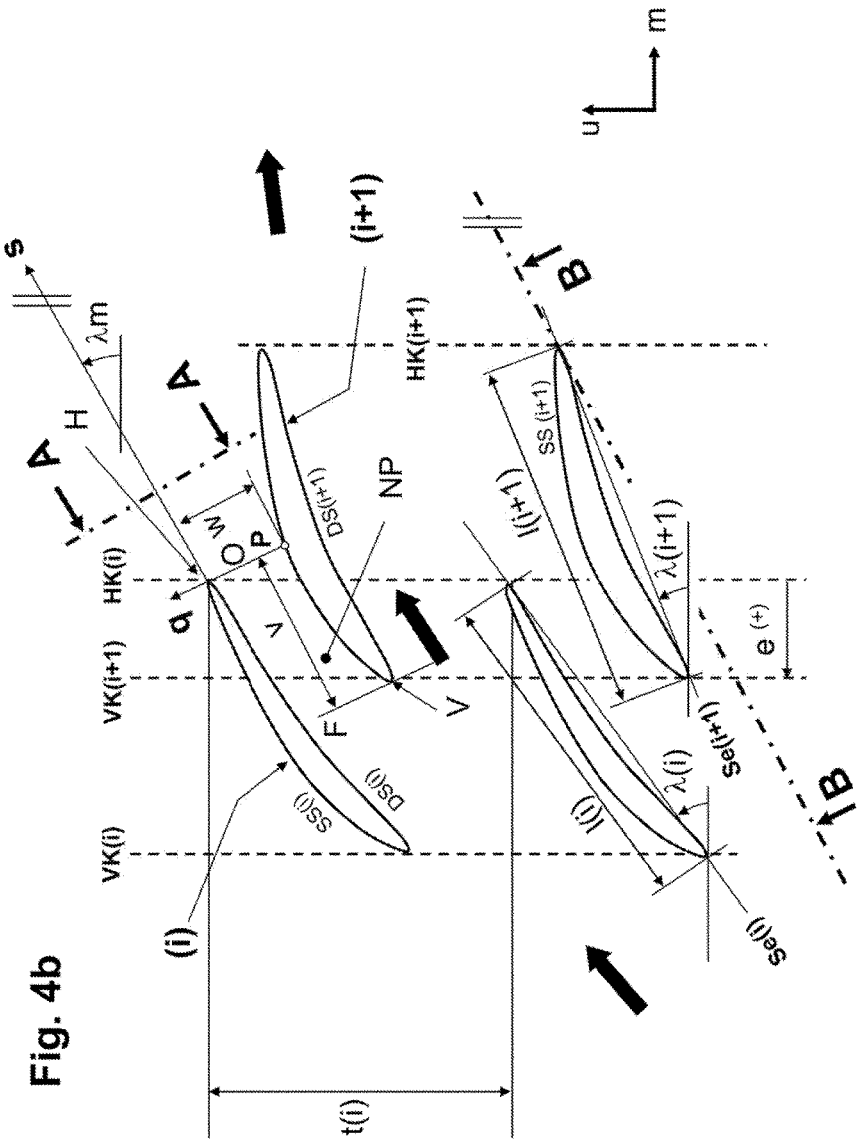

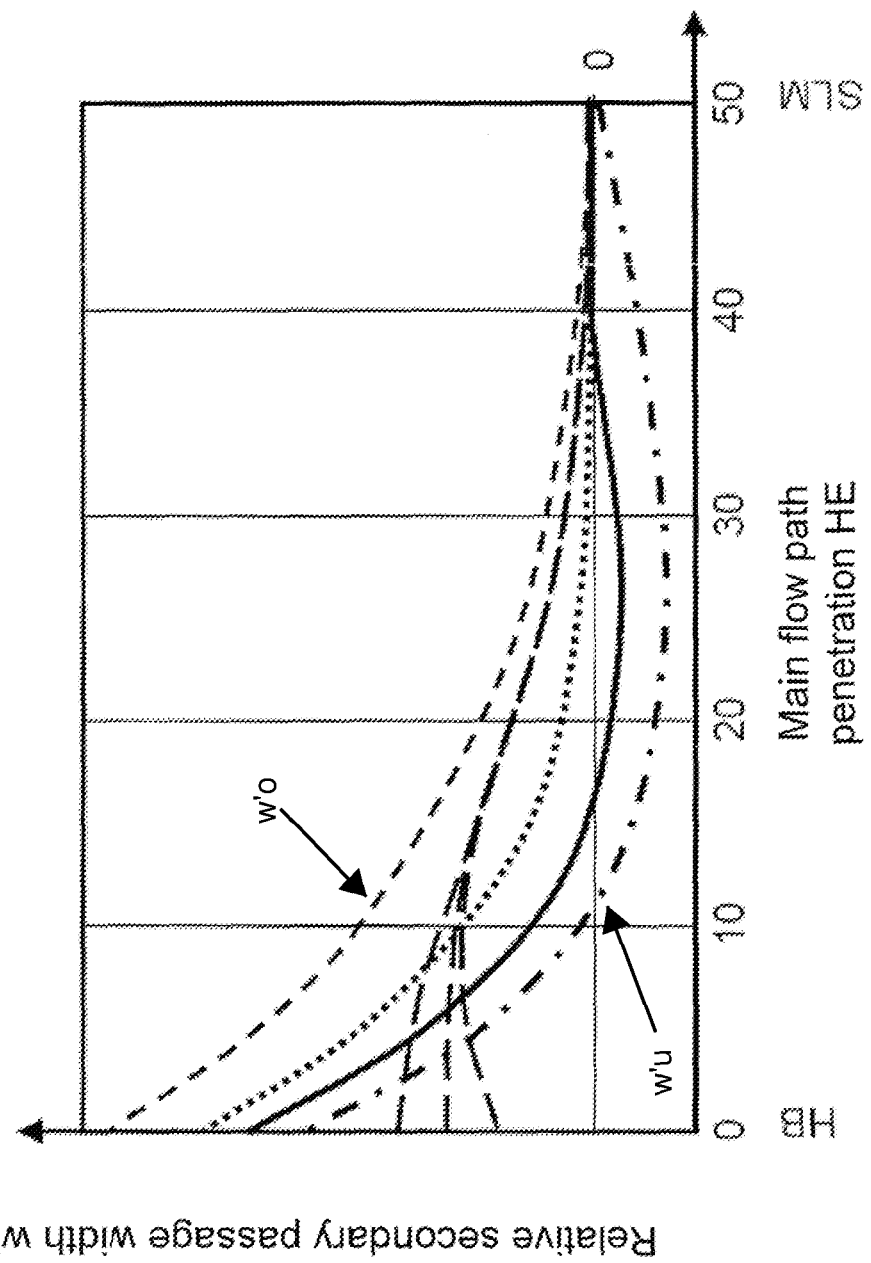

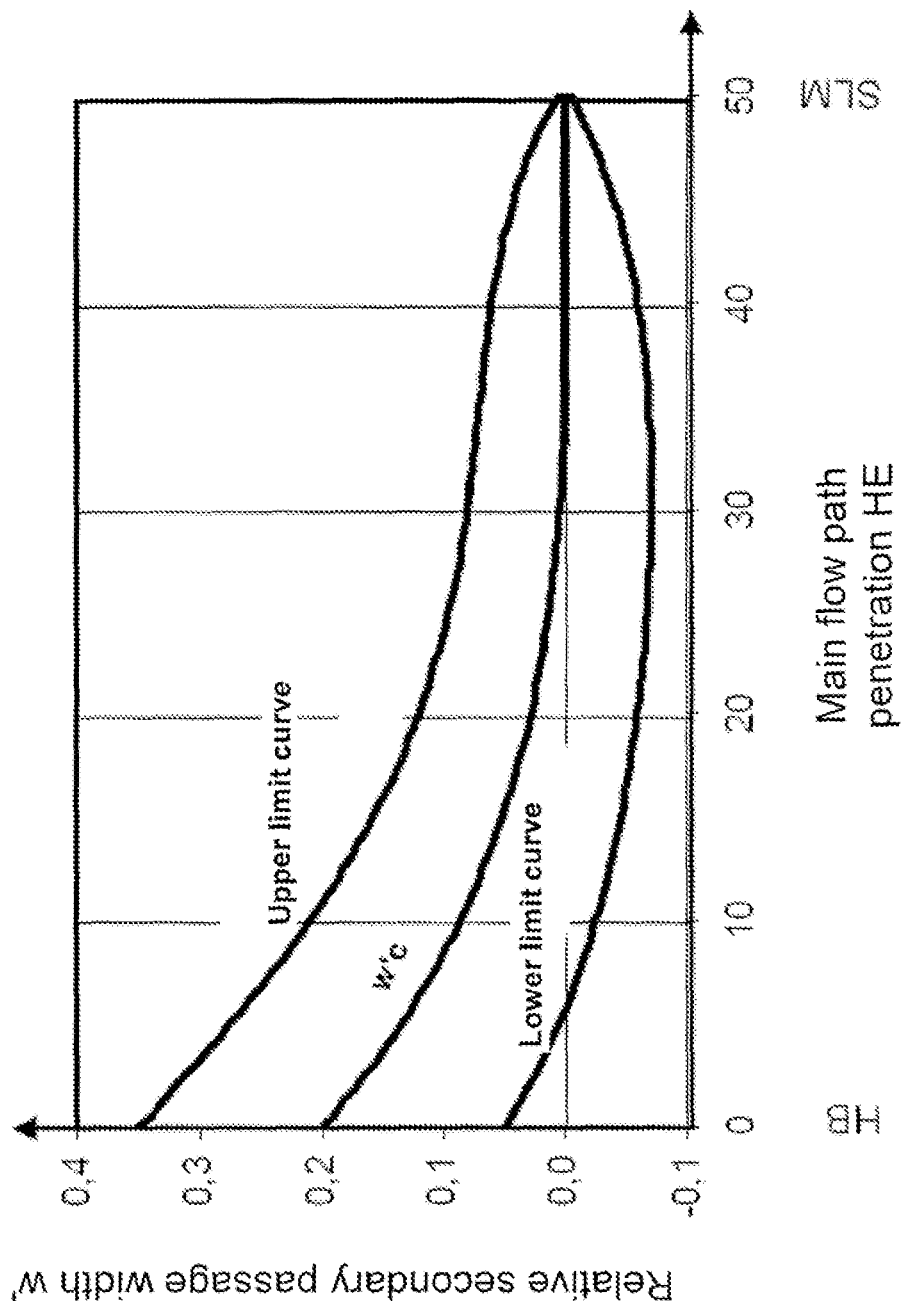

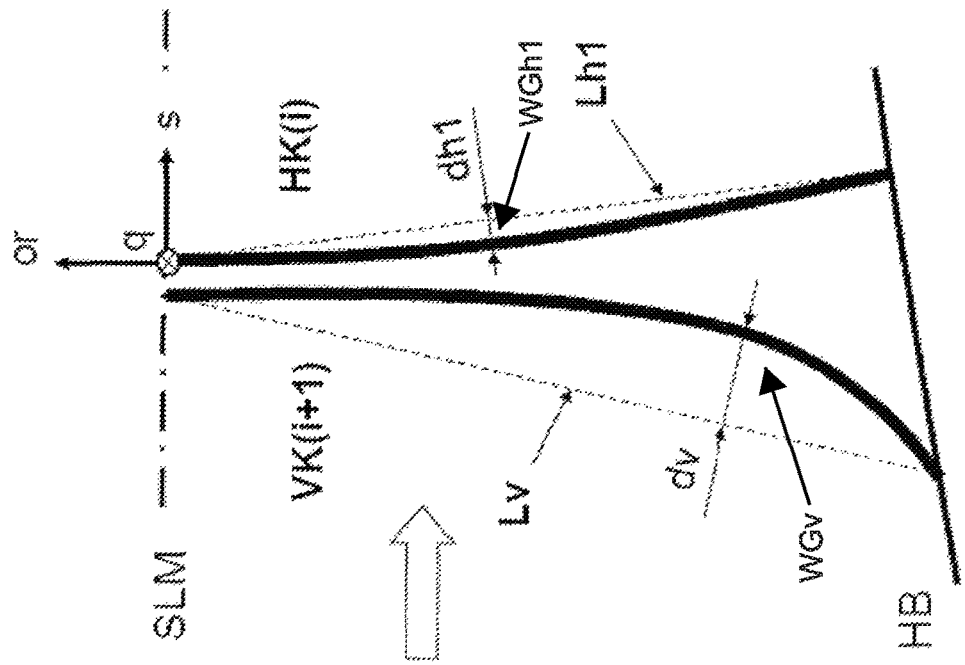
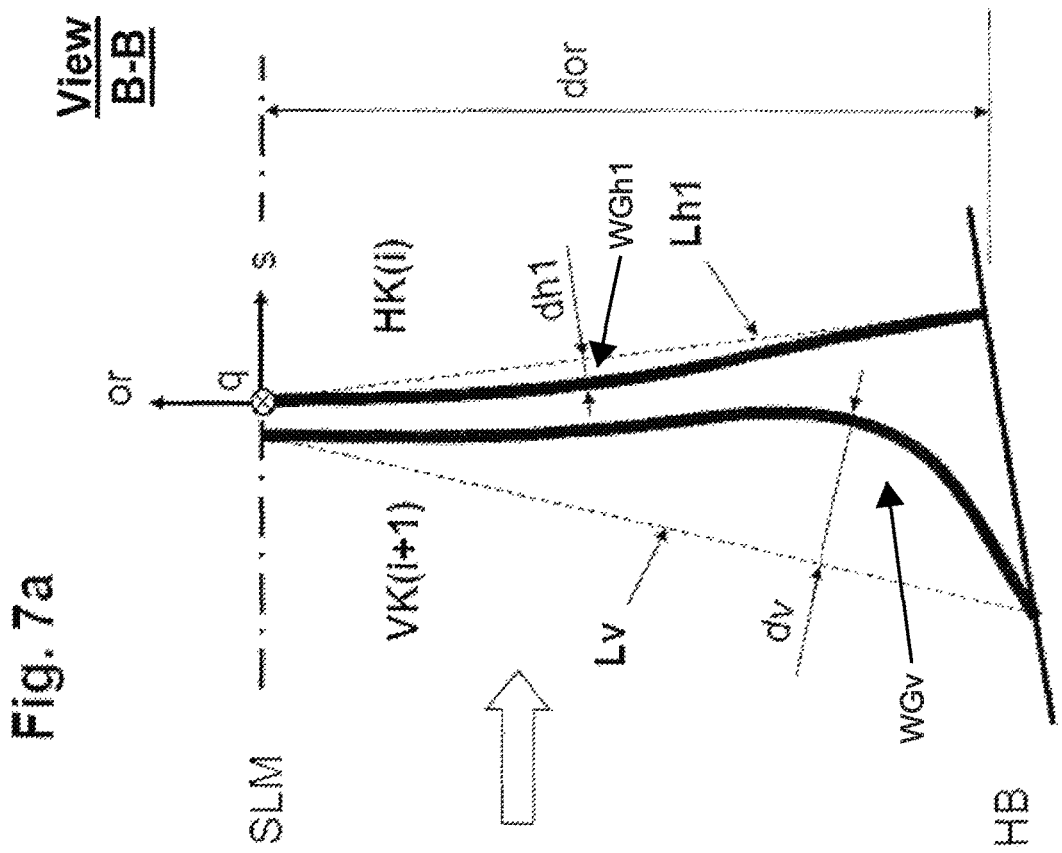

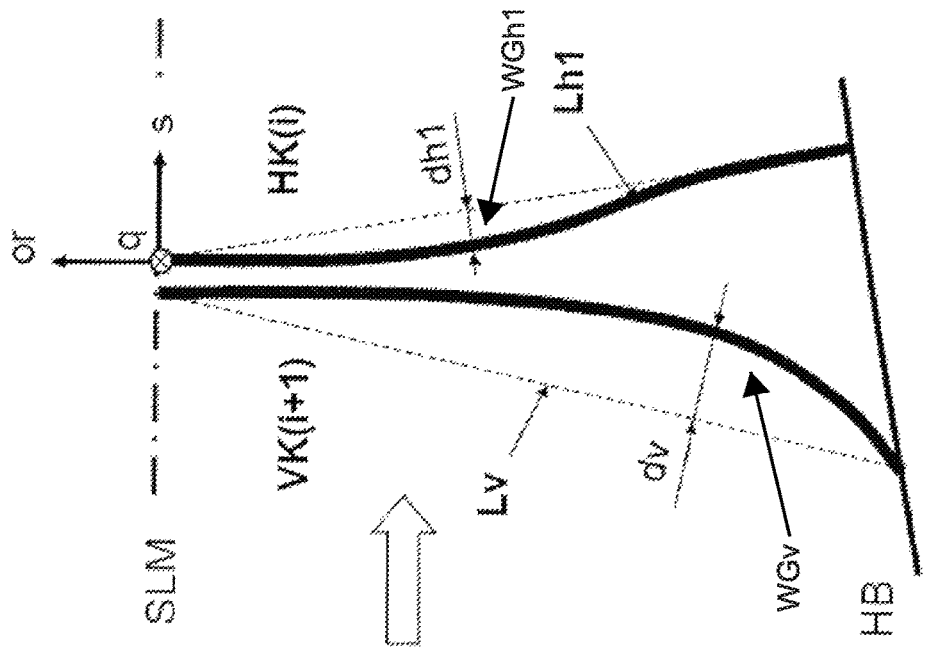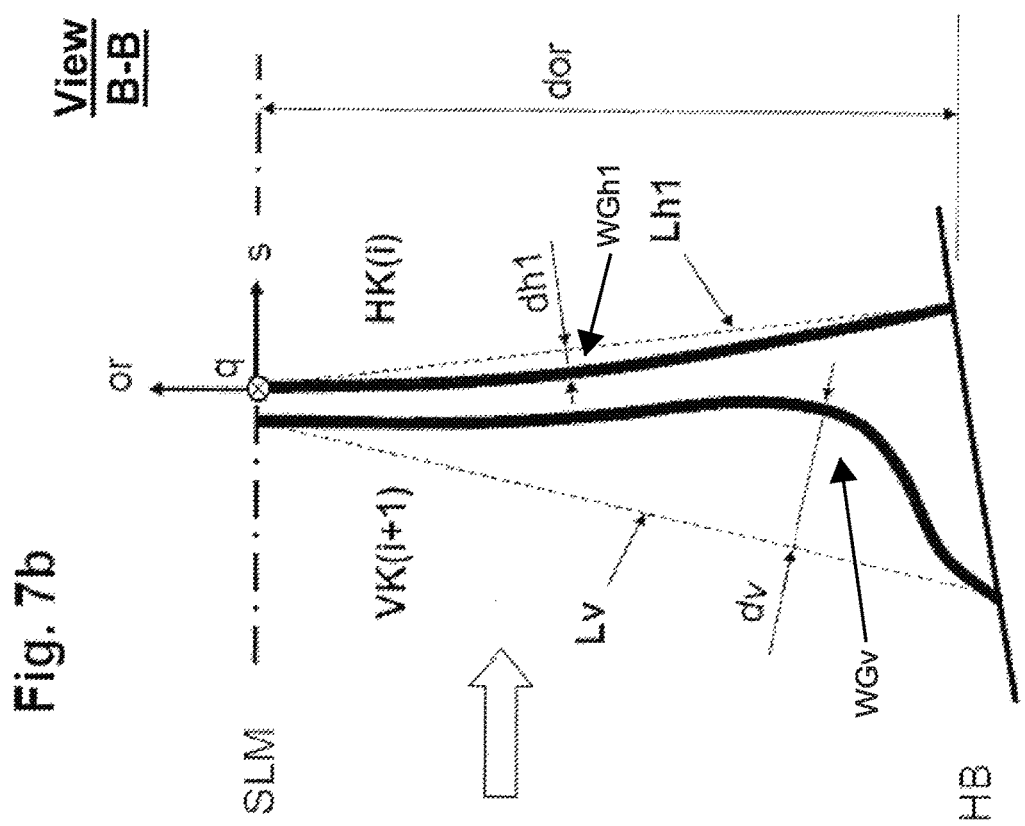

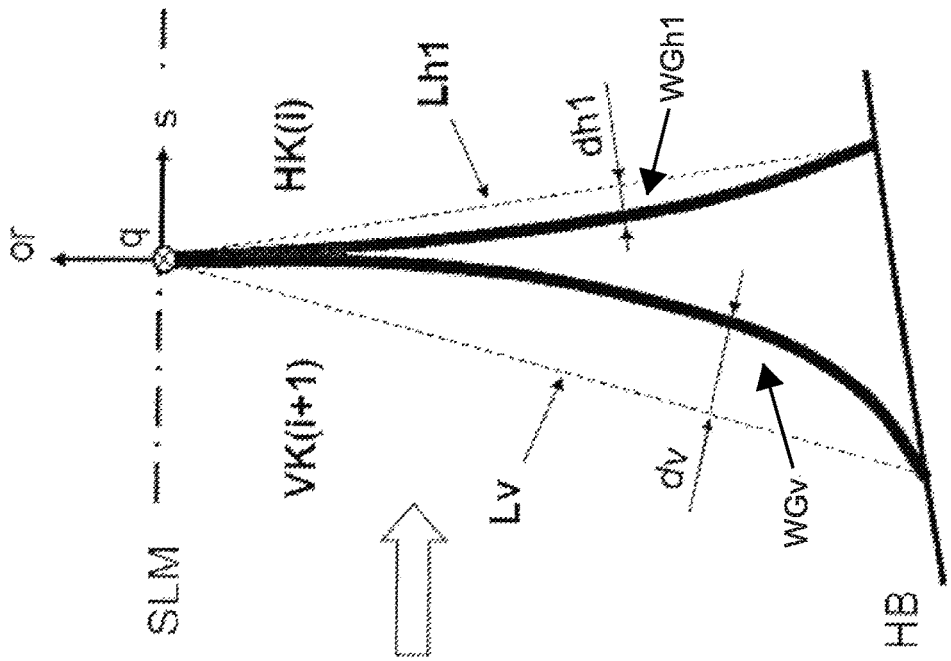
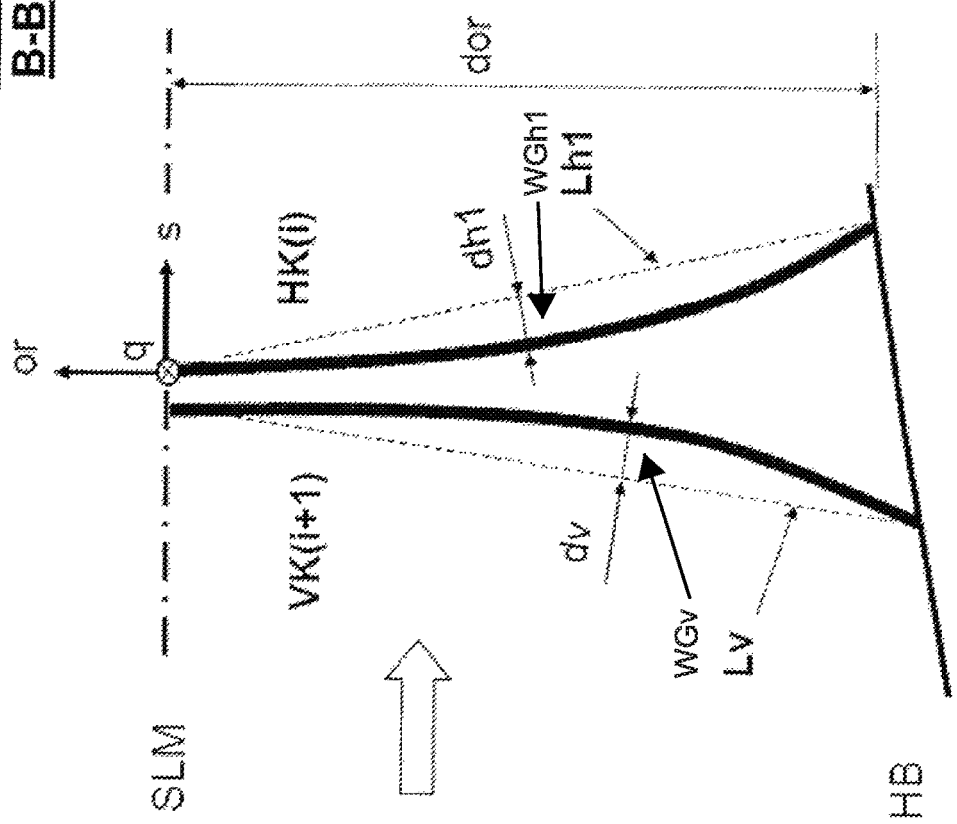
Fig. 7c

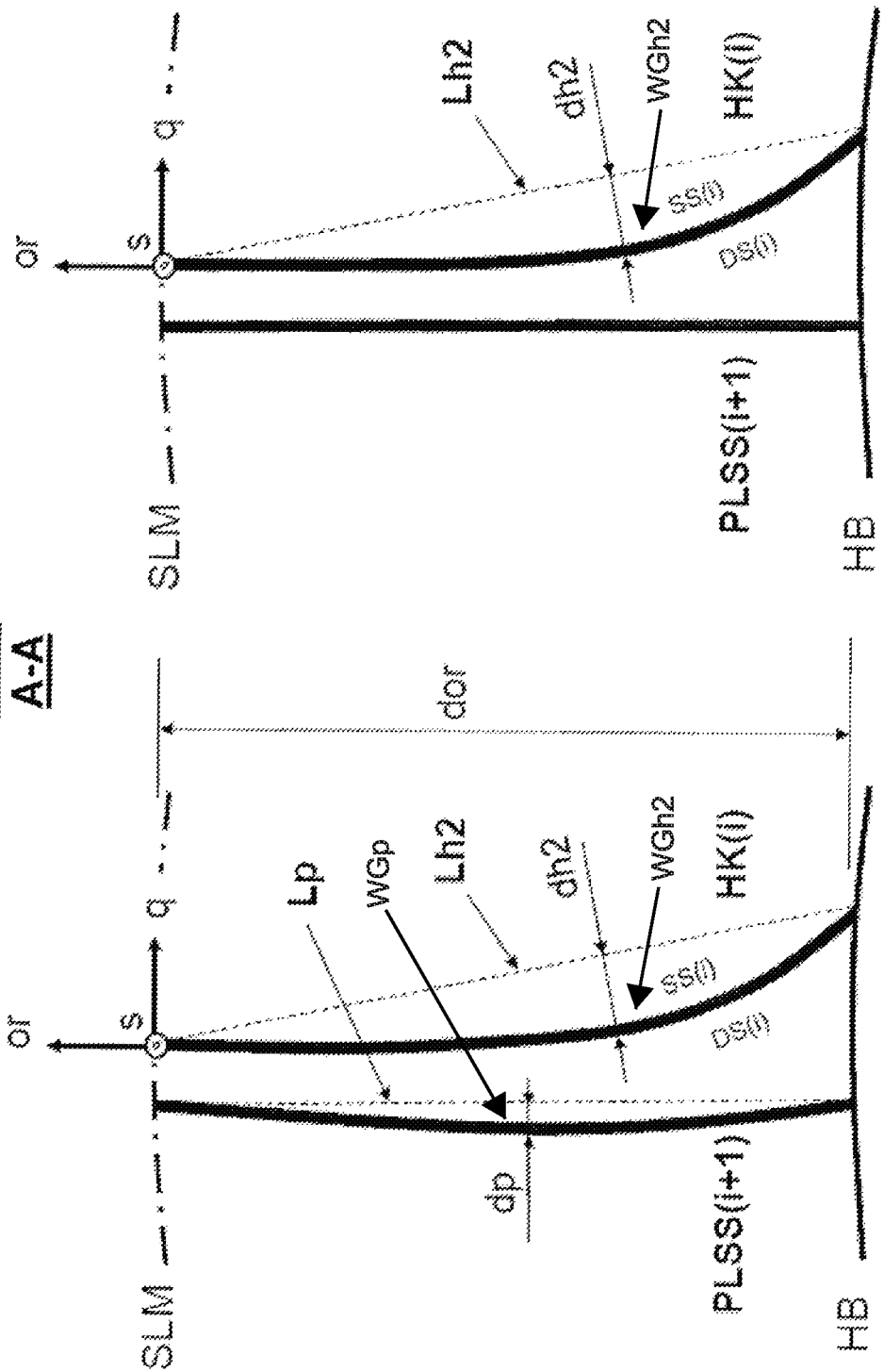

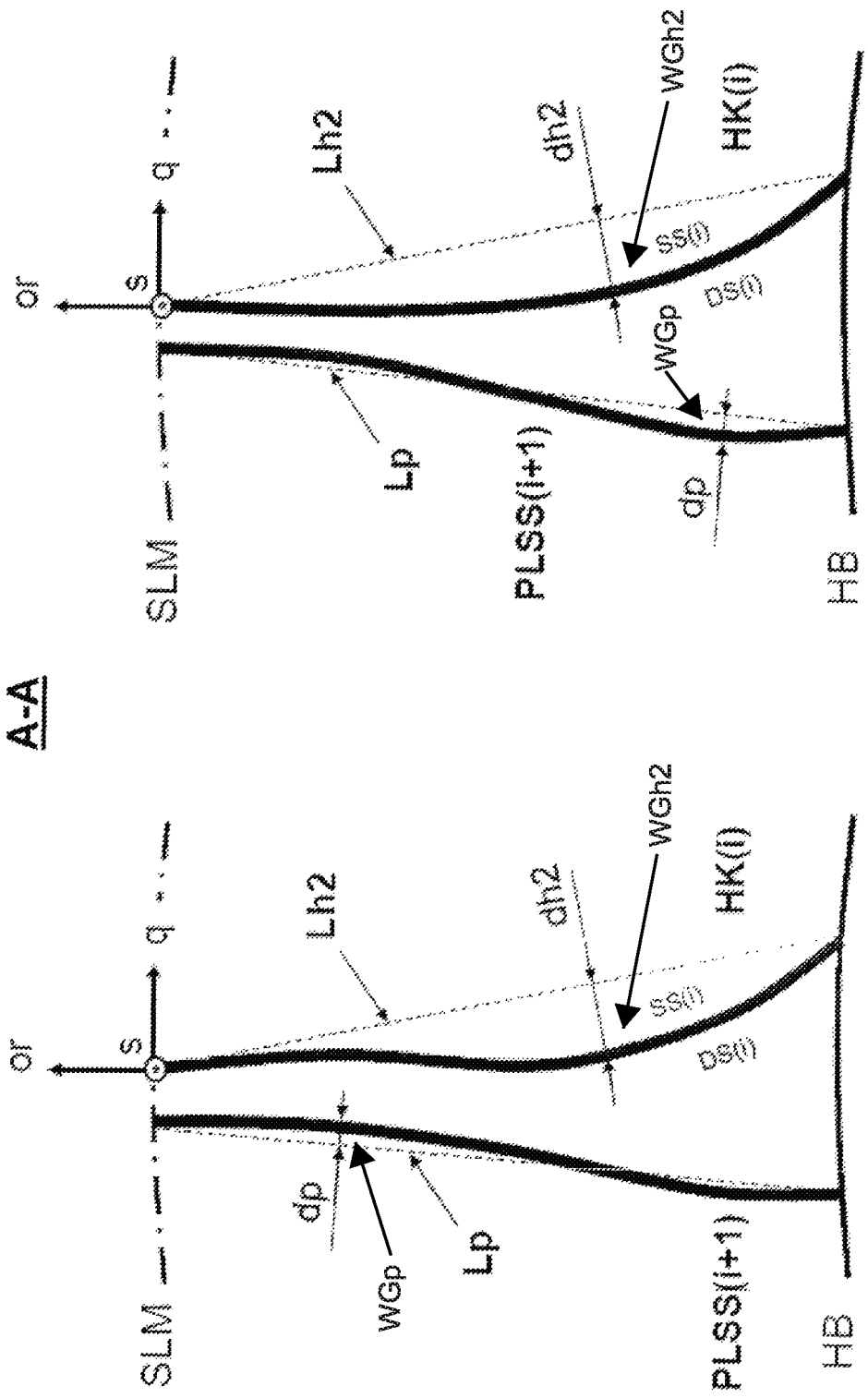

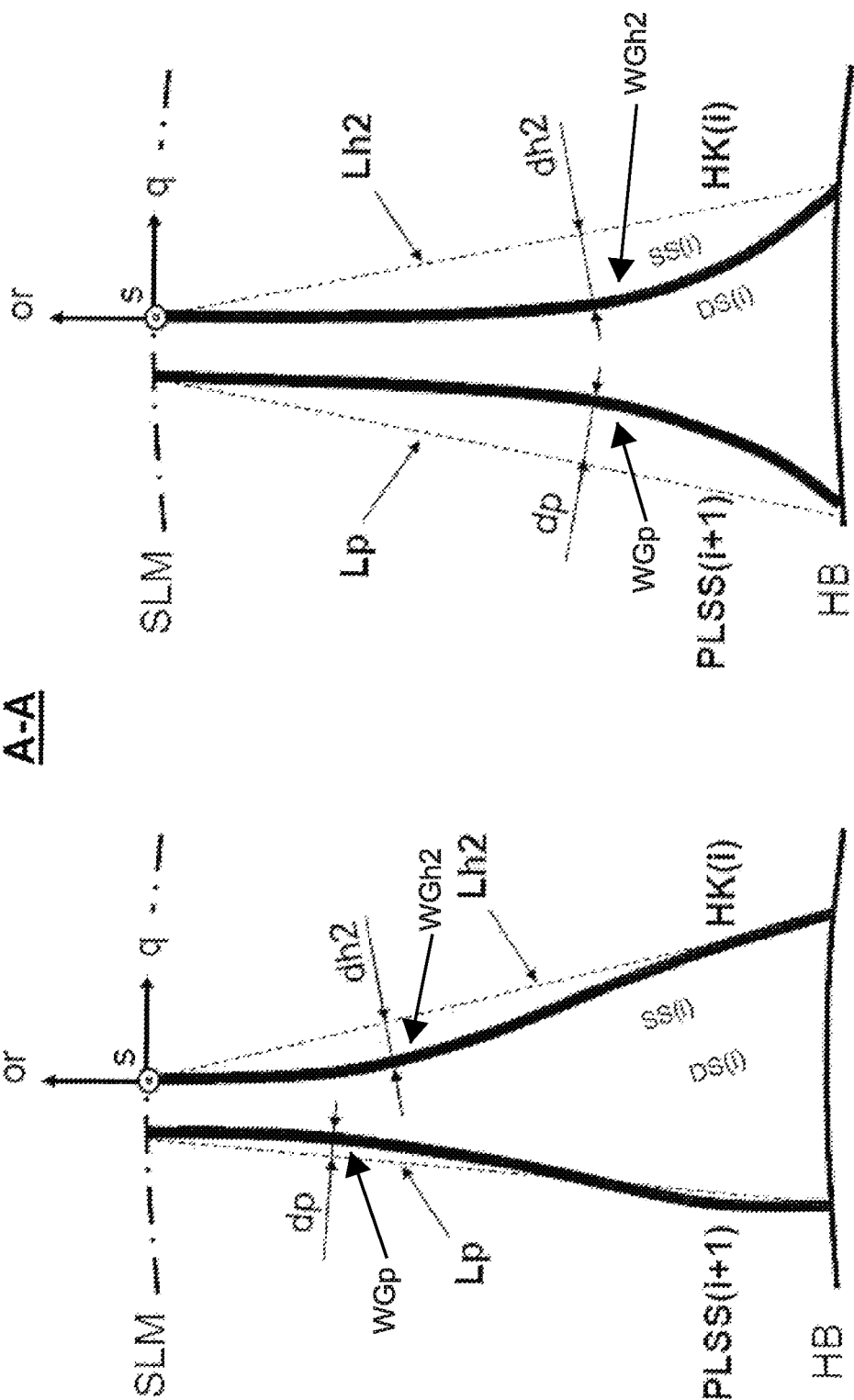

GROUP OF BLADE ROWS

CROSS-REFERENCE TO RELATED APPLICATION

This application claims priority to German Patent Application No. 10 2014 203 607.0 filed on Feb. 27, 2014, the entirety of which is incorporated by reference herein.

BACKGROUND

This invention relates to a blade row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as exit stator wheels in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to each other (for example several rotor blade rows on the same drum, or several stator vane rows), severe boundary layer separation occurs at higher aerodynamic loading in the boundary zone of the main flow path, i.e. at the hub or casing contour.

This is primarily due to the fact that the favourable arrangement of two adjacent blade edges of a blade row group in the center of the main flow path has an unfavourable effect in the vicinity of the flow path boundary. The required flow deflection may quickly be so high either in parts of the blade height or along the entire blade height that this conventional arrangement leads to premature separation of the boundary layer flow in the edge areas of the main flow path on the hub and/or the casing walls.

It is known from US 2013/0209223 A1 to vary the meridional overlap between front and rear blades of a blade row group between the center of the main flow path and the main flow path boundary. From US 2013/0209224 A1 it is known to vary the degree of overlap between front and rear blades of a blade row group and also the distance of a front blade to a rear blade between the center of the main flow path and the main flow path boundary.

A variation of the overlap and of the distance is usually obtained with every configuration of a blade row group, without this necessarily having an advantageous effect on the flow. US 2013/0209223 A1 and US 2013/0209224 A1 describe most different possibilities for variation, without using aerodynamically significant parameters. Also, nothing is said about the precise shape of the blade edges in the interference area of two adjacent member blade rows. The shape of the blade edges in the interference area of two adjacent member blade rows is however of crucial importance for favourably influencing the overall flow behaviour. US 2013/0209223 A1 deals with the edge spacing of adjacent member blade rows in the meridional plane (machine side view). The flow direction in blade rows has however a sometimes considerable flow swirl component, so that the blading is sometimes considerably inclined against the meridional direction. Crucial for the aerodynamic behaviour is a fixing of the blade edges perpendicular and parallel to the blade profile chord. A blade edge visible in the meridional plane can therefore be generated by an infinite number of different blade edge shapes fixed in the aerodynamically relevant chord and chord-orthogonal directions. It cannot therefore clearly describe the shape of the blade edges, and accordingly cannot solve the aerodynamic problem of achieving an advantageous effect on the flow.

SUMMARY

An object underlying the present invention is to provide a blade row group that achieves a favourable flow behaviour due to the fixing of aerodynamically relevant features and parameter relationships both in the center area and in the edge areas of the main flow path.

It is a particular object of the present invention to provide solution to the above problems by a blade row group having the features as described herein.

Accordingly, the solution in accordance with the invention provides a blade row group consisting of at least two adjacent blade rows (i) and (i+1) firmly arranged relative to one another (several co-rotating rotor blade rows or several stator vane rows), which can be arranged in a main flow path of a fluid-flow machine. Here, in an area of the blade height adjoining at least one of the main flow path boundaries (hub and casing), the leading edge of at least one blade of the member blade row (i+1) is provided in the vicinity of a blade of the member blade row (i) such that between the pressure side of the blade (i) and the suction side of the blade (i+1) a secondary passage is formed, so that an additional flow guidance and an increased exploitation of the potential effects are achieved in the aerodynamically important interference area of the two member blade rows.

In accordance with the invention, it is provided that a relative secondary passage length v' and a relative secondary passage width w' each increase at least in one part of the area between the mean meridional flow line SLM and at least one of the main flow path boundaries HB towards the main flow path boundary (HB), where the values for the relative secondary passage length v' and the relative secondary passage width w' are, at at least one main flow path boundary (HB), greater than on the mean meridional flow line (SLM) in the main flow path center.

It is further provided in accordance with the invention that in a view directed upstream and parallel to a first coordinate direction s of an auxiliary coordinate system in the mean meridional flow line blade section, the degree of bulge WGh2 of the trailing edge line HK(i) of the front blade (i) in the area between the mean meridional flow line SLM and the main flow path boundary HB is greater than the degree of bulge WGp of the suction-side projection line PLSS(i+1) of the rear blade (i+1).

The degree of bulge WGh2 of the trailing edge line HK(i) is here defined as the greatest ascertainable distance dh2 between the trailing edge HK(i) itself and the straight connecting line Lh2 of its points on the mean meridional flow line SLM and at the main flow path boundary HB relative to the meridional flow surface-orthogonal distance dor on the trailing edge line HK(i) between the main flow path boundary HB and the mean meridional flow line SLM, in accordance with WGh2=dh2/dor. Furthermore, the degree of bulge WGp of the suction-side projection line PLSS(i+1) is defined as the greatest ascertainable distance dp between the projection line PLSS(i+1) itself and the straight connecting line Lp of its points on the mean meridional flow line SLM and at the main flow path boundary HB relative to the meridional flow surface-orthogonal distance dor between the main flow path boundary HB and the mean meridional flow line SLM, in accordance with WGp=dp/dor.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 4a shows a blade row group in accordance with the present invention including a circumferential view.

FIG. 4b shows definitions in accordance with the present invention on a meridional flow line section.

FIG. 6a shows a qualitative definition in accordance with the present invention of the relative secondary passage width.

FIG. 6b shows a quantitative definition in accordance with the present invention of the relative secondary passage width.

FIG. 7a shows definitions in accordance with the present invention of the leading edge VK(i+1) of the rear blade and of the trailing edge HK(i) of the front blade.

FIG. 7b shows further definitions in accordance with the present invention of the leading edge VK(i+1) of the rear blade and of the trailing edge HK(i) of the front blade, FIG. 7c shows further definitions in accordance with the present invention of the leading edge VK(i+1) of the rear blade and of the trailing edge HK(i) of the front blade.

FIG. 8a shows definitions in accordance with the present invention of the trailing edge HK(i) of the front blade and of the suction-side projection line PLSS (i+1) of the rear blade.

FIG. 8b shows further definitions in accordance with the present invention of the trailing edge HK(i) of the front blade and of the suction-side projection line PLSS (i+1) of the rear blade.

FIG. 8c shows further definitions in accordance with the present invention of the trailing edge HK(i) of the front blade and of the suction-side projection line PLSS (i+1) of the rear blade.

DETAILED DESCRIPTION

Figure 1:
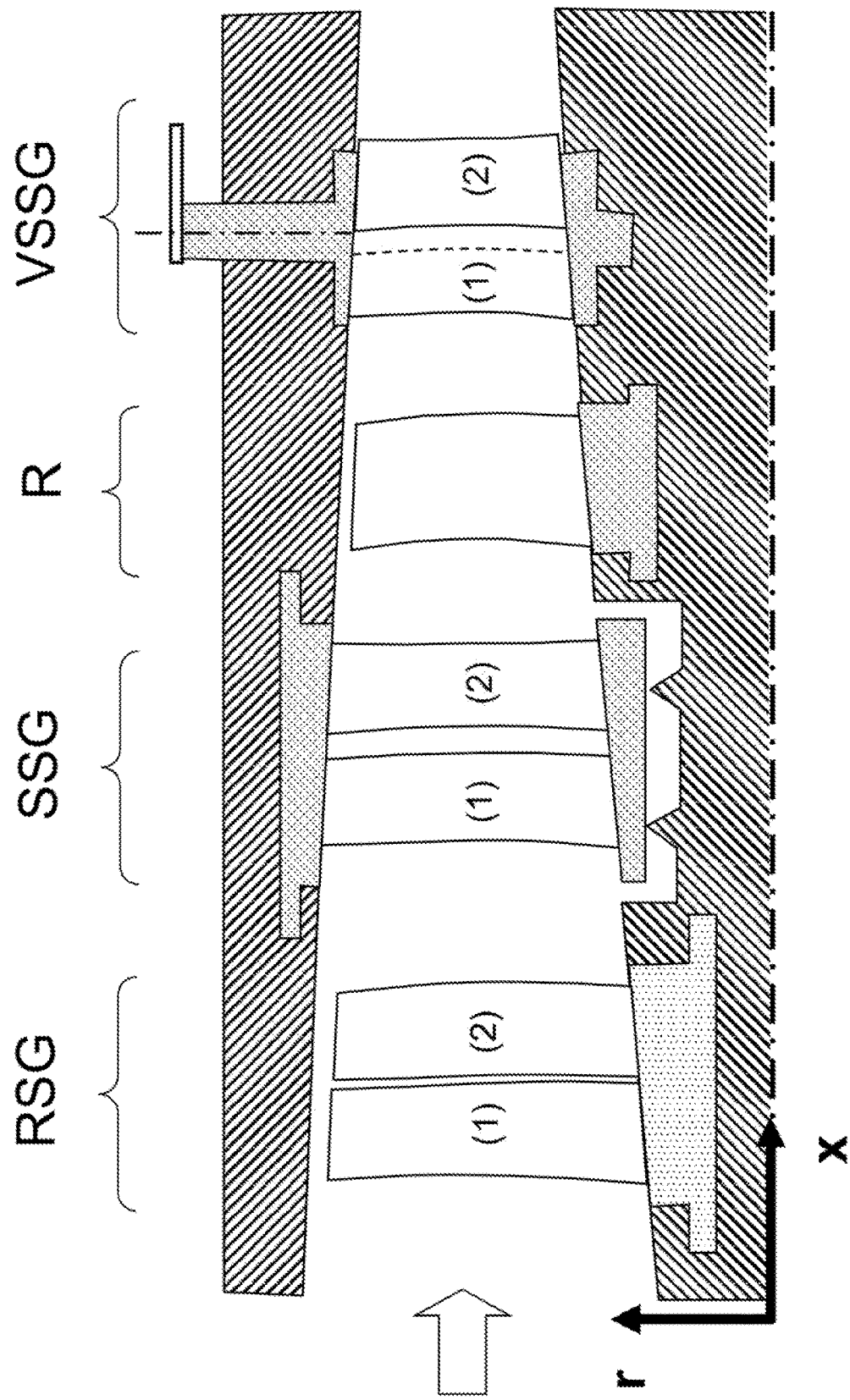
FIG. 1 shows several blade row groups in accordance with the state of the art.

A conventional blade row group in accordance with the state of the art, as shown in FIG. 1, has approximately constant distances between the blade edges of directly adjacent members of the blade row group.

FIG. 1 shows, in the meridional plane established by the axial direction x and the radial direction r, several blade row groups, with each of the blade row groups including two similar member blade rows showing no variation in their relative arrangement to one another (both circumferentially and meridionally). This relates therefore to double-row stator wheels or rotor wheels.

Accordingly, a rotor blade row group RSG includes two rotor blade rows rotating at the same speed and being connected to each other, with the first member of the group being marked (1) and the second member of the group being marked (2). A stator vane row group SSG includes two directly adjacent stationary stator vane rows (1) and (2).

A variable stator vane row group VSSG includes two directly adjacent stator vane rows (1) and (2), with one vane of the front row and one vane of the rear row being each provided on a common rotary base and thus jointly settable about the rotary axis.

Common to all state-of-the-art blade row groups is that either the two members of the blade row group are arranged far from one another or the individual members are arranged close to one another, however without overlapping in the profile chord direction and/or in the meridional direction, and a distance from "trailing edge of member (1)" to "leading edge of member (2)" is provided substantially constant. Also, the definitions of an overlap and a variation of an overlap in the blade height direction are state of the art, but there are no technical teachings for fixing the blade edges in the viewing planes relevant for the flow-related problems, and there are no guidelines either for fixing favourable variations of an overlap or for a relationship between the two quantities—overlap and spacing of the profiles of a member blade (1) and of a member blade (2)—which are dominant for interference in flow potential theory.

The solutions according to the state of the art are either unserviceable due to the lack of relevant criteria or are highly disadvantageous for the flow in the vicinity of the main flow path boundary (hub or casing).

Figure 2A:
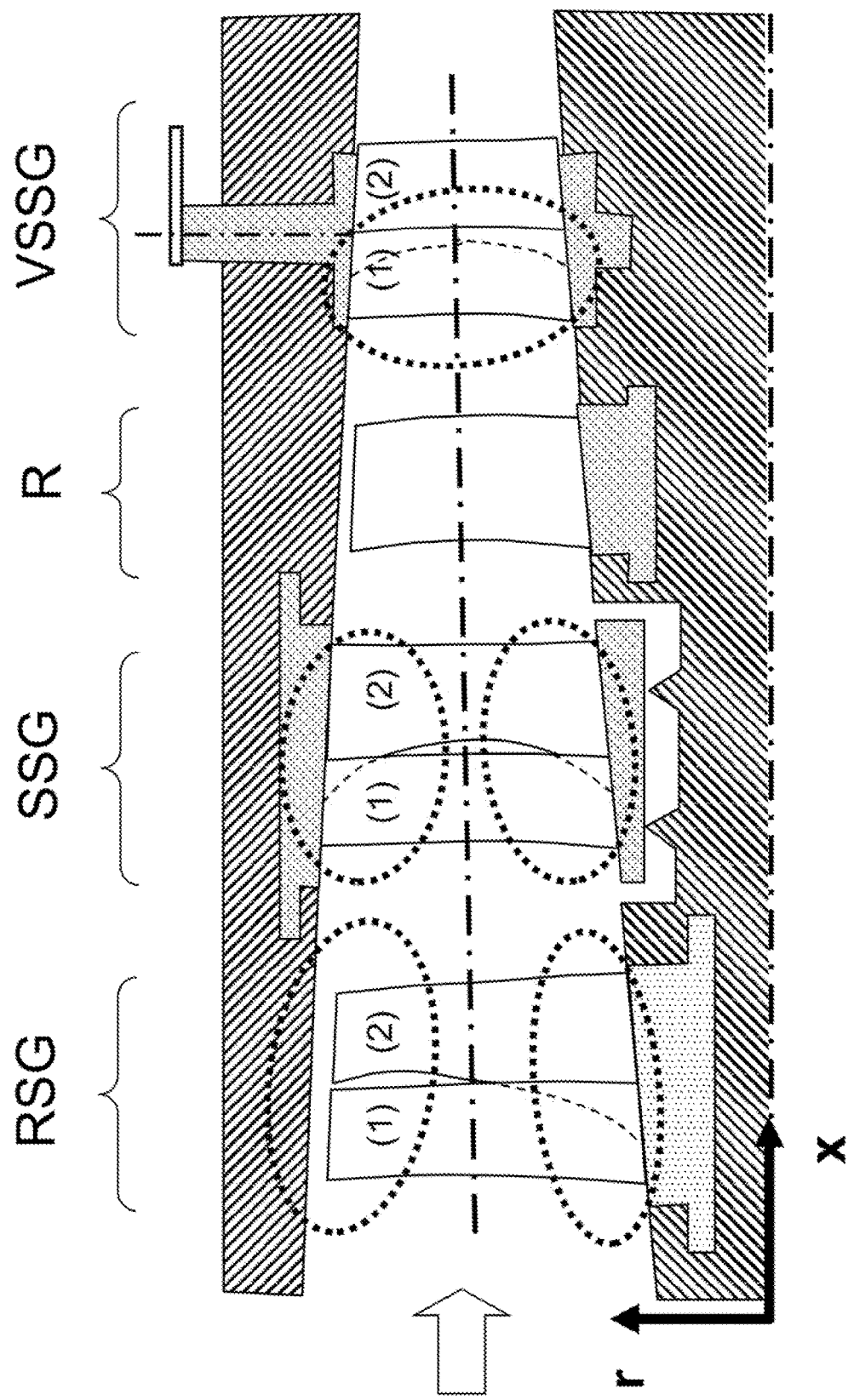
FIG. 2a shows a summary of several blade row groups in accordance with the present invention.

FIG. 2a shows, in the meridional plane established by the axial direction x and the radial direction r, several blade row groups in accordance with the present invention, with each of the blade row groups including two similar member blade rows showing no variation in their relative position to one another.

Accordingly, a rotor blade row group RSG according to the present invention includes at least two rotor blade rows rotating at the same speed and being connected to each other. A stator vane row group SSG according to the present invention includes at least two directly adjacent stationary stator vane rows.

A variable stator vane row group VSSG according to the present invention includes at least two directly adjacent stator vane rows. A vane of one of the member vane rows, together with at least one vane of its immediately downstream member vane row, is here provided on a common rotary base. Alternatively, as not illustrated herein, at least two vanes appertaining to different member vane rows can also be arranged on an individual rotary base each.

Characteristic for the blade row group according to the present invention is that in at least one area of the blade height adjoining one of the main flow path boundaries (hub and casing), between the front section of the suction side of a blade in a member blade row (i+1) and the rear section of the pressure side of a blade in a member blade row (i), a secondary passage is provided which guides the flow locally and whose secondary passage length relative to the profile depth of the blade row (i) increases in the direction of at least one of the main flow path boundaries in order to favourably match the interference behaviour of the member blade rows (i) and (i+1) along the blade height to the requirements close to the main flow path boundaries.

It can occur here, depending on the stagger angle of the blade arrangement, that in certain cases the leading edge of the blade in the row (i+1), viewed in the meridional direction, is provided between the leading edge and the trailing edge of the upstream member blade row (i), and the meridional meshing too, measured from the trailing edge of the member blade row (i) to the leading edge of the member blade row (i+1) and counted positively upstream, increases in the direction of at least one of the main flow path boundaries. It is however also possible, in particular in the case of high stagger angles of the blade arrangement, for a secondary passage to be formed, without a meridional meshing being present. Some exemplary embodiments with and without meridional meshing are sketched as examples in FIG. 2a in the zones, situated close to the main flow path boundary, of the rotor blade row group RSG, the stator vane row group SSG and the variable stator vane row group VSSG.

Figure 2B:
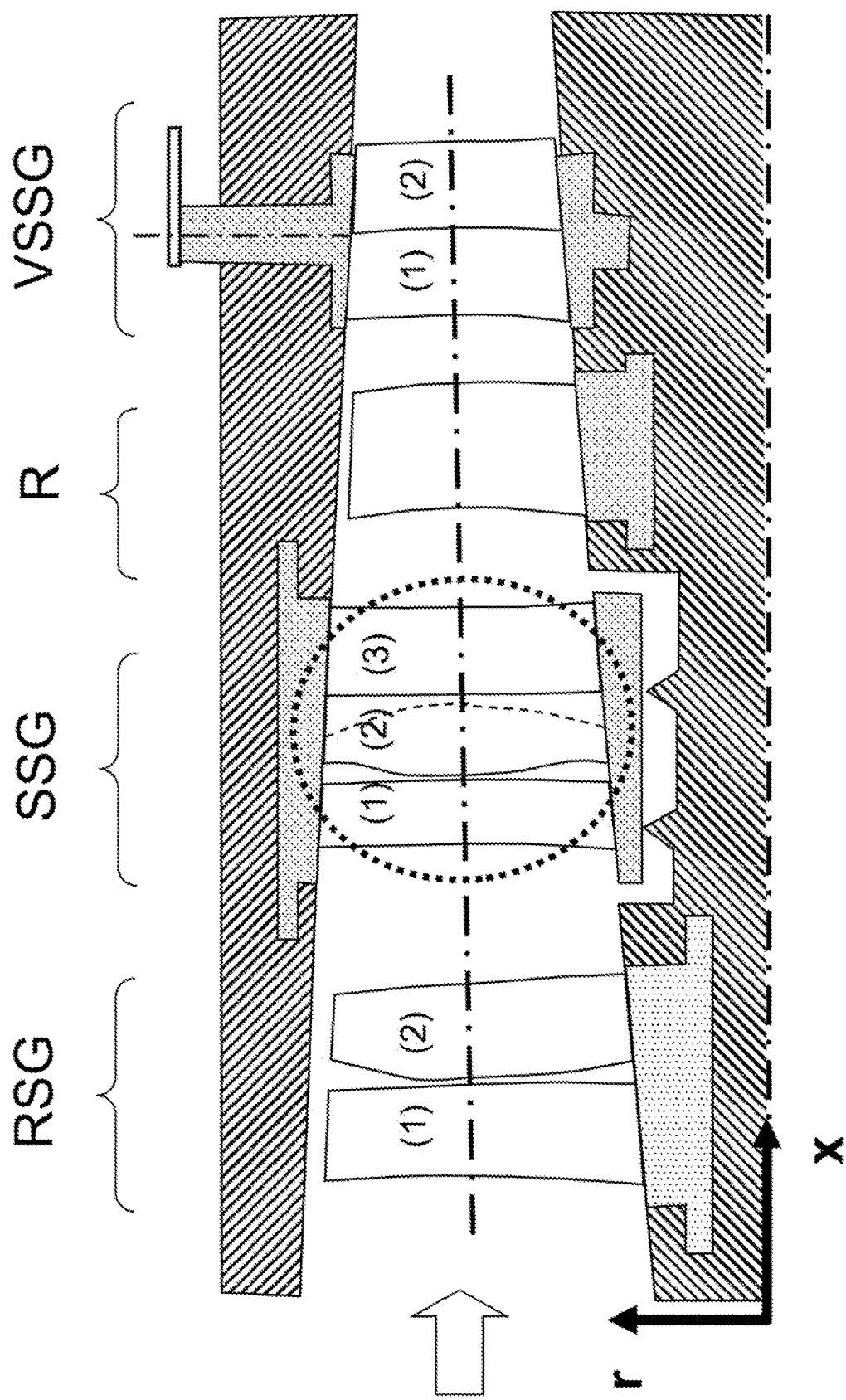
FIG. 2b shows a summary of further blade row groups in accordance with the present invention.

As shown in FIG. 2b, the blade row group in accordance with the present invention can also have more than two member blade rows, as exemplified here for a number of 3 on the stator vane row group SSG. As not explicitly shown here, a rotor blade row group RSG or a variable stator vane row group can also have more than 2 member blade rows.

The described configuration of the blade row group includes the possibility that on at least one member blade row the distance between two adjacent blades varies along the circumference. It may also be favourable if the axial position of two adjacent blades of this blade row varies along the circumference. It may also be favourable if the profile depth of two adjacent blades of this blade row varies along the circumference.

It may be advantageous if the numbers of blades of two adjacent member blade rows are in a special ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1).

Figure 3:
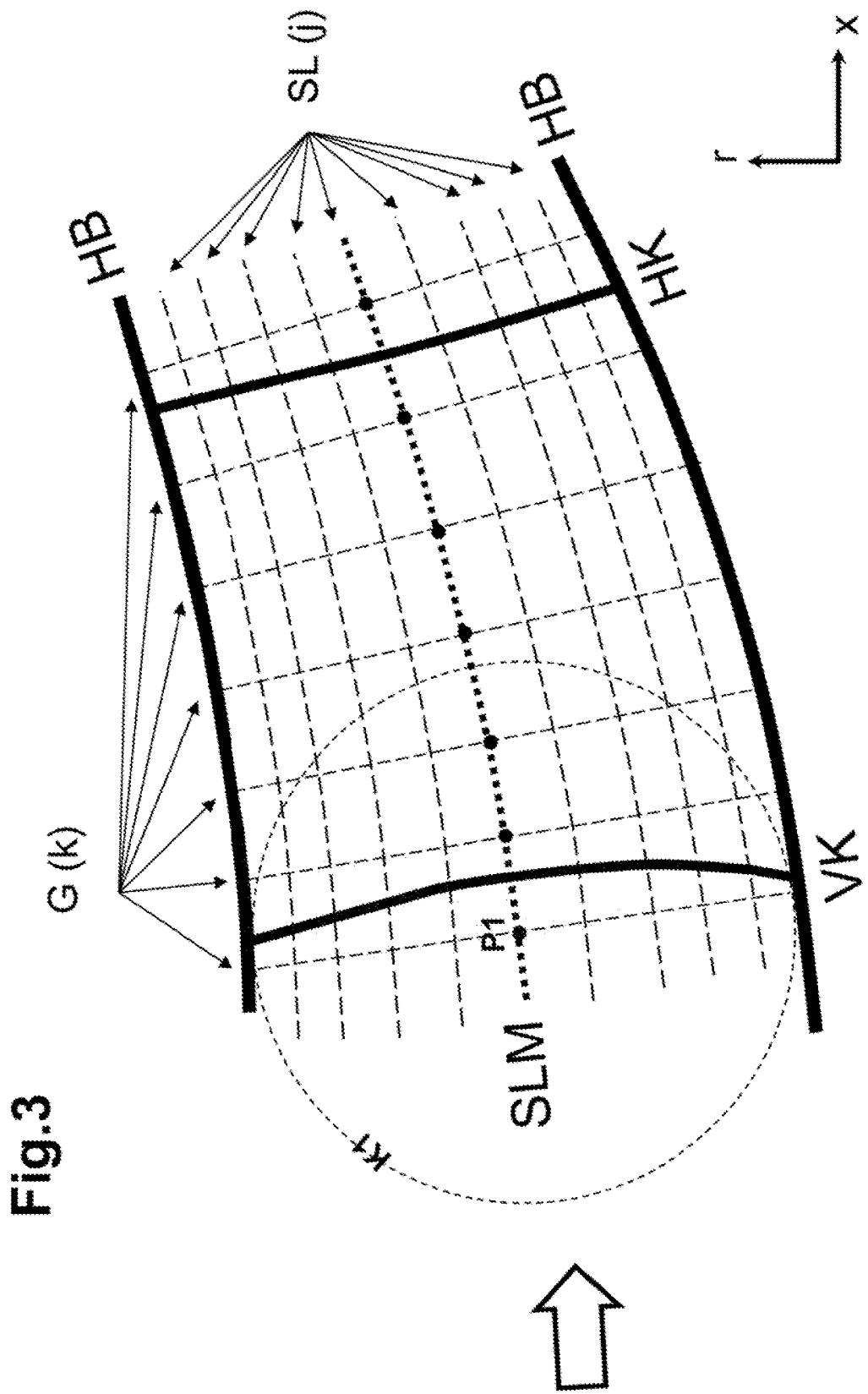
FIG. 3 shows the definition of meridional flow lines.

FIG. 3 shows, for the definition of meridional flow lines, a main flow path of a fluid-flow machine with through-flow from left to right (indicated by the bold arrow), in the meridional plane established by the axial coordinate x and the radial coordinate r, where the main flow path is limited by the radially inner main flow path boundary HB and by the radially outer main flow path boundary HB. The mean meridional flow line SLM is in the center between the radially inner main flow path boundary HB and the radially outer main flow path boundary HB. Its course matches the connection of the center points of circles inscribed in the main flow path, as is made clear by the example in the picture for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case. The rotation of a meridional flow line about the machine axis results in a meridional flow surface. The intersection of a meridional flow surface with a blade of the fluid-flow machine results in a meridional flow line section.

FIG. 4a shows on the left-hand side, in the meridional plane established by the axial direction x and the radial direction r, an arrangement of two adjacent member blade rows (i) and (1+1) appertaining to a blade row group according to the present invention. It is understood that the respective blade row group may include more than the two member blade rows shown each.

Shown is the inventive arrangement in the area between the main flow path center (mean flow line SLM along the meridional direction m there) and a main flow path boundary HB. The main flow path boundary HB is a contour at the hub or at the casing of the fluid-flow machine, for example at a rotary base, a wall, a stator root, a stator shroud, a rotor root or a rotor shroud.

The main flow path boundary HB is either firmly connected to the end of at least one member blade row (as shown in FIG. 4a), or a gap is provided between the main flow path boundary and at least the end of a member blade row.

The arrangement shows the two member blade rows (i) and (i+1), each with a leading edge VK and a trailing edge HK. The present invention considers the course of the leading edge VK(i+1) and the course of the trailing edge HK(i) as well as the course of the leading edge VK(i+1) relative to the course of the trailing edge HK(i) in flow-mechanically relevant planes.

An arrangement is shown here which has in the meridional direction, in an area adjoining the main flow path center (SLM), a gap between the member blade rows (i) and (i+1), and in an area adjoining the main flow path boundary provides for an overlap of the member blade rows (i) and (i+1). It is therefore provided that in at least one area of the main flow path height from the leading edge VK(i+1) of the rear member blade row to the trailing edge HK(i) of the front member blade row a meridional meshing is provided whose amount increases in the direction of at least one of the main flow path boundaries HB in at least one partial section. A meridional meshing of this type can be provided for all exemplary embodiments of the invention.

As shown by the sectional views along the lines M-M and W-W on the right-hand side of FIG. 4a, in both areas the leading edge of at least one blade of the member blade row (i+1) is here provided in the vicinity of a blade of the member blade row (i) such that a secondary passage (illustrated as a shaded area and identified with NP) is created between the pressure side of the blade (i) and the suction side of the blade (i+1), so that an additional flow guidance and an increased exploitation of the potential effects are achieved locally in the aerodynamically important interference area of the two member blade rows.

The right-hand side of FIG. 4a shows the arrangement of the two member blade rows viewed in the meridional flow surface established by the meridional coordinate m and the circumferential direction u. An appropriate circumferential development along the meridional flow surface is shown for the meridional flow line blade section M-M in the main flow path center and for the meridional flow line blade section W-W at the main flow path boundary. For simplicity's sake (but not absolutely necessary in accordance with the invention), the two member blade rows here have the same blade numbers. Also advantageous is a blade number ratio of 1:2 for the rows (i) and (i+1), where every second blade of the row (i+1) is arranged close to the pressure side of a blade of the row (i). The suction sides of the blades (i) and (i+1) are identified respectively with SS(i) and SS(i+1), and the pressure sides with DS(i) and DS(i+1).

Not only in the figure shown here, but valid for all solutions in accordance with the invention, it can be advantageous if, when viewed in the circumferential direction u, a blade of the row (i+1) is provided closer to the pressure side DS(i) of a blade of the row (i). It can, as shown here, be advantageous if the distance measured in the circumferential direction u between the suction side of a blade of the row (i+1) and the pressure side of a blade of the row (i) is greater at the main flow path boundary HB than in the area of the mean flow line when this distance to the main flow path boundary HB thus increases.

FIG. 4b shows a meridional flow line blade section and the definition of various relevant quantities and views in the plane established by the meridional direction m and by the circumferential coordinate u, i.e. in a meridional flow line blade section. For simplification, only two blades and the intermediate blade main passage of the member blade rows (i) and (i+1) are shown in each case. The main flow direction is identified by bold black arrows. The connecting lines of the blade edges are accordingly identified with VK(i), HK(i), VK(i+1) and HK(i+1). Each blade profile is shown with its suction side SS and its pressure side DS. It is pointed out that for purposes of a clearer illustration in FIG. 4b and also in the other figures, no distinction is made between the identification of the member blade rows (i) and (i+1) and the identification of the individual blades in the member blade rows, i.e. the blades too are identified with (i) and (i+1).

The chord Se(i) of the front blade is defined as the tangent lying on the profile of the blade (i) on the pressure side. The chord Se(i+1) of the rear blade is defined as the tangent lying on the profile of the blade (i+1) on the pressure side. The profile depth I(i) of the front blade and the profile depth I(i+1) of the rear blade are shown in the direction of the respective chord.

The stagger angle of the front blade lambda(i) ($\lambda(i)$) is defined as the angle of inclination of the chord of the front blade S(i) relative to the meridional direction m. The stagger angle of the rear blade lambda(i+1) ($\lambda(i+1)$) is defined as the angle of inclination of the chord of the rear blade S(i+1) relative to the meridional direction m. The mean stagger angle lambdam ($\lambda m$) is defined as the mean value of the stagger angles lambda(i) and lambda(i+1) in accordance with: lambdam=(lambda(i)+lambda(i+1))/2. The coordinate direction s is inclined with lambdam relative to the meridional direction m and faces downstream.

The front blade spacing t(i) is defined as the distance in the circumferential direction u between two adjacent blades of the front blade row (i) in their trailing edge plane.

A smaller flow duct, here identified as the secondary passage NP, is formed between the suction side of a blade in row (i+1) and the pressure side of a blade in row (i).

The secondary passage length v is defined as the distance between the trailing edge point H of the blade (i) and the leading edge point V of the blade (i+1) in the direction of the coordinate s. The secondary passage length v is therefore equal to the distance between the orthogonals O and F, where O is perpendicular to the coordinate direction s and passes through the trailing edge point H of the blade (i) and where F runs parallel to O and through the leading edge point V of the blade (i+1).

The value of v on the mean meridional flow line SLM is identified in the following with vSLM.

The relation to the profile depth of the two blades (i) and (i+1), in particular to the profile depth of the front blade (i), is relevant for flow mechanics since their profile pressure distribution is most greatly changed by the potential effect of the leading edge of the blade (i+1). For this reason, the standardized secondary passage length must be considered, in accordance with: vn=v/I(i).

The value of vn on the mean meridional flow line SLM is identified in the following with vnSLM. The relative secondary passage length v' is defined as v'=(v−vSLM)/I(i).

The secondary passage width w is defined as the distance between the trailing edge point H of the blade (i) and a point P on the suction side of the blade (i+1), where the point P results as the intersection point of the orthogonal O erected in the trailing edge point H of the blade (i) in the coordinate direction s with the suction side of the blade (i+1), where said orthogonal O is oriented against the coordinate direction q leading away from the pressure side of the blade (i). The value of w on the mean meridional flow line SLM is identified in the following with wSLM. The connection of all points P determined along the blade height in various meridional flow line blade sections results in the suction-side projection line PLSS(i+1) of the rear blade (i+1).

The relation to the distance of adjacent blades, in particular of the row (i), is relevant for flow mechanics since their profile pressure distribution is most greatly changed by the potential effect of the leading edge of the blade (i+1). For this reason, the standardized secondary passage width must be considered, in accordance with: wn=w/(t(i)cos lambdam).

The value of wn on the mean meridional flow line SLM is identified in the following with wnSLM. The relative secondary passage width w' is defined as w'=(w−wSLM)/(t(i)cos lambdam).

The intensity of the flow-mechanical interference between the blades (i) and (i+1) is mainly determined by the length-width ratio of the secondary passage. The length-width ratio LWV is therefore a further dimension for fixing favourable parameters of the blade row group. It is defined as LWV=v/w. This results in a high interference intensity at high values of LWV. The value of LWV on the mean meridional flow line SLM is identified in the following with LWVSLM.

The relative length-width ratio LWV' is defined as the difference from the value in the mean meridional flow line SLM, in accordance with LWV'=LWV−LWVSLM.

The meridional meshing e is measured parallel to the direction of the meridional coordinate m from the leading edge of a blade (i+1) to the trailing edge of a blade (i) and has a positive sign against the meridional flow direction.

For the definition of the views A-A and B-B, it is now assumed that the meridional flow line blade section shown in FIG. 4b is located on the mean meridional flow line SLM. The mean chord direction identified by the coordinate direction s is representative of the local main flow direction in the flow-mechanical interference area of the blades (i) and (1+1). A fixed relationship to this identified and important mean chord direction is therefore essential for stipulating characteristic features of a blade row group that are correct in terms of flow mechanics. The quantities of secondary passage length and secondary passage width are for that reason defined in the coordinate system of the mean chord direction and their orthogonals. In addition, in the views A-A and B-B, the blade edges can be assessed and described in terms of their flow-mechanical effect.

The view A-A is upstream and parallel to the mean chord direction—identified by the coordinate direction s—of the blade arrangement in the mean meridional flow line section.

The view B-B is tangential to the mean meridional flow section (conical surface around the machine axis) and perpendicular to the mean chord direction—identified by the coordinate direction s—of the blade arrangement in the mean meridional flow line blade section.

Stipulations in accordance with the present invention for the secondary passage length are made in the following.

In the mean meridional flow line section SLM, the flow behaviour of the blade row group is free from influences of the main flow path boundaries HB, so that a secondary passage length must be stipulated there under primarily two-dimensional considerations. The profile pressure distribution of both blade (i) and blade (i+1) must be designed for the highest possible yield in lift, which can be achieved with a comparatively low standardized secondary passage length vnSLM:

$$0 \leq vnSLM \leq 0.3.$$

A stipulation of $0 \leq vnSLM \leq 0.15$ has a favourable effect. A stipulation of $0.02 \leq vnSLM \leq 0.1$ has a particularly favourable effect. With structural restrictions on the blade row group, it is still favourable when $0.1 \leq vnSLM \leq 0.3$ applies, or under heavy restrictions $0.15 \leq vnSLM \leq 0.3$.

The same stipulations for vn can apply, in accordance with the invention, for meridional flow line sections in the vicinity of the main flow path center with main flow path penetrations greater than or equal to 30%.

Assuming a value vnSLM in the center of the main flow path, stipulations for the secondary passage length in the direction of the main flow path boundary HB are made in the following. This is done using the relative secondary passage length v' (difference of the standardized secondary passage length from the value in the main flow path center).

Figure 5A:
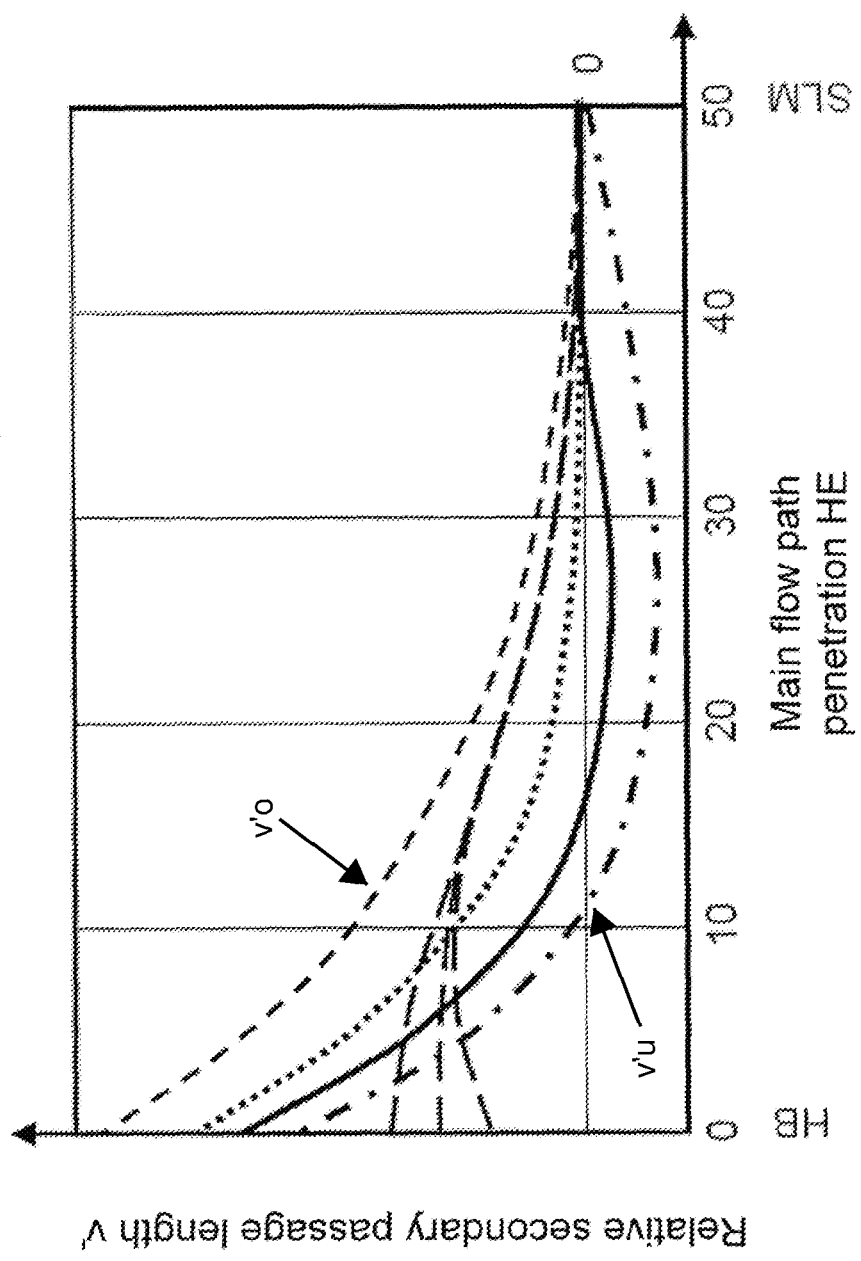
FIG. 5a shows a qualitative definition in accordance with the present invention of the relative secondary passage length.

FIG. 5a shows some forms, possible in accordance with the invention, of the course of the relative secondary passage length v', plotted over the main flow path penetration HE. The latter is measured as a percentage of the total main flow path height and accordingly has the value zero at the main flow path boundary HB and the value 50 on the mean meridional flow line SLM.

It can be provided that the value of v' at the main flow path boundary HB is greater than on the mean flow line SLM, where the value of v' in a part of the area between the main flow path boundary HB and the mean meridional flow line SLM rises towards the main flow path boundary.

It can additionally be provided here that the value of v' in an area adjoining the main flow path boundary HB rises continuously towards the main flow path boundary, with further advantages resulting when the value of v' rises progressively; under specific restrictions a degressive rise of v' can also be achieved in accordance with the invention.

Alternatively, it can additionally be provided that the value of v' in an area adjoining the main flow path boundary HB remains substantially or exactly constant towards the main flow path boundary.

Alternatively, it can additionally be provided that the value of v' in an area adjoining the main flow path boundary HB decreases towards the main flow path boundary.

It is advantageous for the three design alternatives of the course of v' as described above when said "area adjoining the main flow path boundary HB" has a main flow path penetration of $HE \geq 10\%$ and in special cases of $20\% \leq HE \leq 30\%$.

It can furthermore be favourable when the course of v' in the area between the main flow path boundary HB and the mean flow line SLM has a minimum value.

It can furthermore be favourable that the value of v' in an area adjoining the mean meridional flow line SLM remains substantially or exactly constant towards the main flow path boundary, where further advantages are achieved if said "area adjoining the mean meridional flow line SLM" extends up to a main flow path penetration HE of less than or equal to 35%.

Figure 5B:
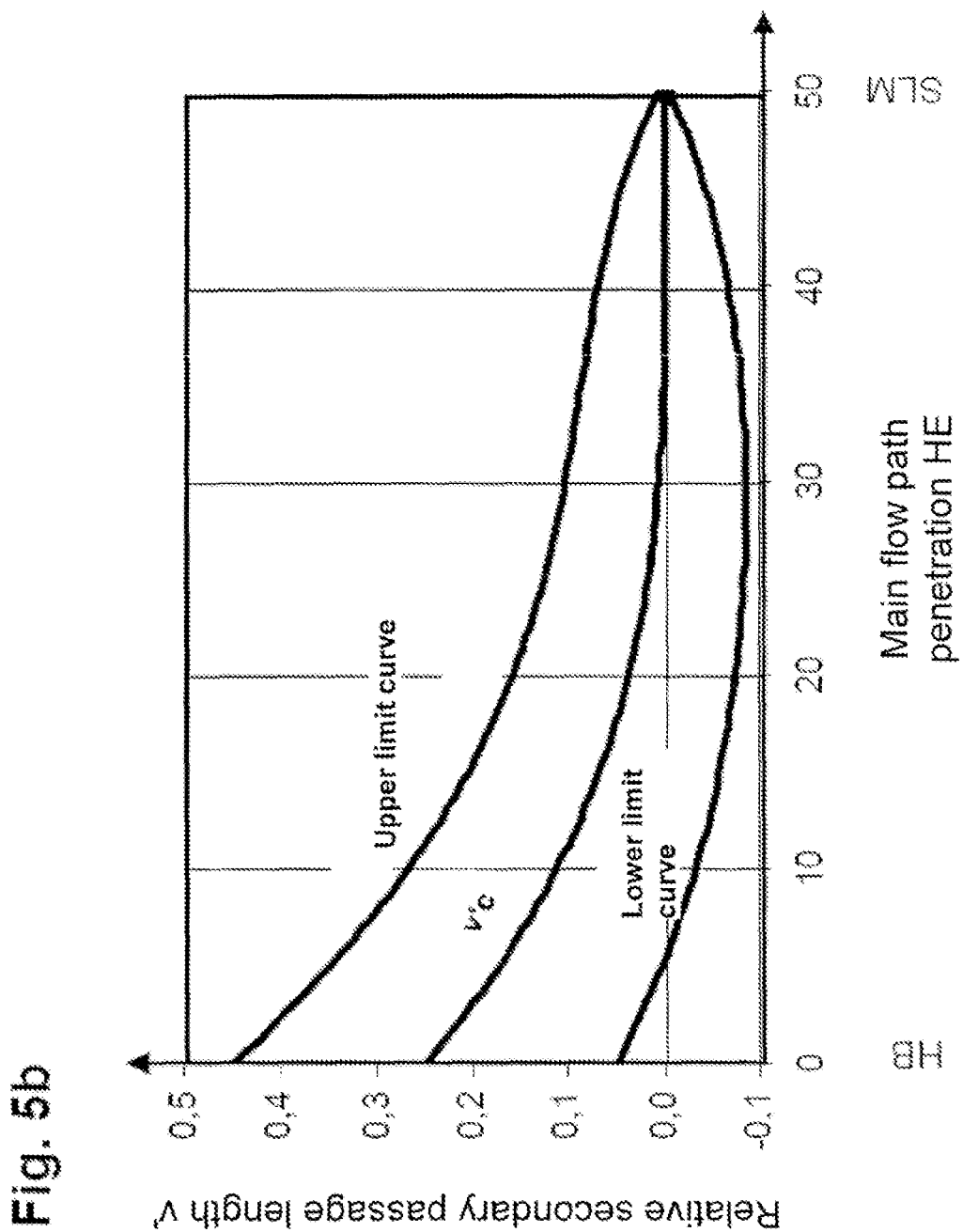
FIG. 5b shows a quantitative definition in accordance with the present invention of the relative secondary passage length.

FIG. 5b shows further definitions, in accordance with the invention, for the course of the relative secondary passage length v', plotted over the main flow path penetration HE.

It can be provided that for the relative secondary passage length v' at the main flow path boundary HB the following applies: $0.05 \leq v' \leq 0.45$ ($\leq$ means less than or equal to).

It can furthermore be provided that the distribution of the relative secondary passage length v' over the main flow path penetration HE is completely below an upper limit curve v'o and completely above a lower limit curve v'u, where said upper limit curve is provided by:

$$v'o = -6E\text{-}08(HE)^{}4 + 4E\text{-}07(HE)^{}3 + 0.0004(HE)^{**}2 - 0.0224(HE) + 0.45$$

and said lower limit curve is provided by:

$$v'u = 5E\text{-}08(HE)^{}4 - 5E\text{-}06(HE)^{}3 + 0.0003(HE)^{**}2 - 0.0111(HE) + 0.05$$

It can furthermore be favourable when the distribution of the relative secondary passage length v' is defined within a band around a central distribution v'c, in accordance with:

$$v'c - 0.1 < v' < v'c + 0.1,$$

where the following applies:

$$v'c = 3E\text{-}09(HE)^{}4 - 3E\text{-}06(HE)^{}3 + 0.0004(HE)^{**}2 - 0.0176(HE) + 0.25$$

It can furthermore be favourable when the distribution of the relative secondary passage length v' is defined within a narrow band around a central distribution v'c, in accordance with:

$v'c-0.05 < v' < v'c+0.05$, where the following applies:

$v'c = 3E\text{-}09(HE)^{}4 - 3E\text{-}06(HE)^{}3 + 0.0004(HE)^{**}2 - 0.0176(HE) + 0.25$ Stipulations in accordance with the invention for the secondary passage width are made in the following.

In the mean meridional flow line section SLM, the flow behaviour of the blade row group is free from influences of the main flow path boundaries HB, so that a secondary passage width must be stipulated there under primarily two-dimensional considerations. The profile pressure distribution both of the blade (i) and of the blade (i+1) must be designed for the highest possible yield in lift, which can be achieved with a comparatively low standardized secondary passage width wnSLM:

$0.02 <= wnSLM <= 0.3$.

A stipulation of $0.05 <= wnSLM <= 0.2$ has a favourable effect. A stipulation of $0.05 <= wnSLM <= 0.15$ has a particularly favourable effect. With structural restrictions on the blade row group, it is still favourable when $0.15 <= wnSLM <= 0.3$ applies, or under heavy restrictions $0.2 <= vnSLM <= 0.3$.

The same stipulations for wn can apply, in accordance with the invention, for meridional flow line sections in the vicinity of the main flow path center with main flow path penetrations greater than or equal to 30%.

Assuming a value wnSLM in the center of the main flow path, stipulations for the secondary passage width in the direction of the main flow path boundary HB are made in the following. This is done using the relative secondary passage width w' (difference of the standardized secondary passage width from the value in the main flow path center).

FIG. 6a shows some forms, possible in accordance with the invention, of the course of the relative secondary passage width w', plotted over the main flow path penetration HE.

It can be provided that the value of w' at the main flow path boundary HB is greater than on the mean flow line SLM, where the value of w' in a part of the area between the main flow path boundary HB and the mean meridional flow line SLM rises towards the main flow path boundary.

It can additionally be provided here that the value of w' in an area adjoining the main flow path boundary HB rises continuously towards the main flow path boundary, with further advantages resulting when the value of w' rises progressively; under specific restrictions a degressive rise of w' can also be achieved in accordance with the invention.

Alternatively, it can additionally be provided that the value of w' in an area adjoining the main flow path boundary HB remains substantially or exactly constant towards the main flow path boundary.

Alternatively, it can additionally be provided that the value of w' in an area adjoining the main flow path boundary HB decreases towards the main flow path boundary.

It is advantageous for the three design alternatives of the course of w' as described above when said "area adjoining the main flow path boundary HB" has a main flow path penetration of $HE >= 10\%$ and in special cases of $20\% <= HE <= 30\%$.

It can furthermore be favourable when the course of w' in the area between the main flow path boundary HB and the mean flow line SLM has a minimum value.

It can furthermore be favourable when the value of w' in an area adjoining the mean meridional flow line SLM remains substantially or exactly constant towards the main flow path boundary, where further advantages are achieved if said "area adjoining the mean meridional flow line SLM" extends up to a main flow path penetration HE of less than or equal to 35%.

FIG. 6b shows further definitions, in accordance with the invention, for the course of the standardized secondary passage width w', plotted over the main flow path penetration HE.

It can be advantageous, if for the relative secondary passage width w' at the main flow path boundary HB the following applies: $0.05 <= w' <= 0.35$ (<= means less than or equal to).

It can furthermore be advantageous, if the distribution of the relative secondary passage width w' over the main flow path penetration HE is completely below an upper limit curve w'o and completely above a lower limit curve w'u, where said upper limit curve is provided by:

$w'o = -1E\text{-}07(HE)^{}4 + 7E\text{-}06(HE)^{}3 + 0.0001(HE)^{**}2 - 0.0159(HE) + 0.35$ and said lower limit curve is provided by:

$w'u = 8E\text{-}08(HE)^{}4 - 8E\text{-}06(HE)^{}3 + 0.0004(HE)^{**}2 - 0.0108(HE) + 0.05$ It can furthermore be favourable when the distribution of the relative secondary passage width w' is defined within a band around a central distribution w'c, in accordance with:

$w'c - 0.08 < w' < w'c + 0.08$, where the following applies:

$w'c = 2E\text{-}08(HE)^{}4 - 5E\text{-}06(HE)^{}3 + 0.0004(HE)^{**}2 - 0.015(HE) + 0.2$ It can furthermore be favourable when the distribution of the standardized secondary passage width w' is defined within a narrow band, in accordance with:

$w'c - 0.04 < w' < w'c + 0.04$, where the following applies:

$w'c = 2E\text{-}08(HE)^{}4 - 5E\text{-}06(HE)^{}3 + 0.0004(HE)^{**}2 - 0.015(HE) + 0.2$ In addition to the interference parameter "secondary passage length", the individual course of the trailing edge line HK(i) of the front blade (i) and of the leading edge line VK(i+1) of the rear blade (i+1) is also of crucial importance for favourably influencing the three-dimensional flow in the interference area of the blade rows (i) and (i+1).

FIG. 7a shows as bold unbroken lines the trailing edge HK(i) of the front blade and the leading edge VK(i+1) of the rear blade in the area between the main flow path boundary HB and the mean meridional flow line SLM defined with half the blade height, in the s-or plane, where the coordinate direction or is provided orthogonally to the meridional flow surface extending through SLM (view B-B in FIG. 4b). The main flow direction is indicated by a bold arrow. The degree of bulge WGh1 of the trailing edge line HK(i) is defined as the largest ascertainable distance dh1 between the trailing edge line HK(i) itself and the straight connecting line Lh1 of its points on SLM and HB relative to the meridional flow surface-orthogonal distance dor between HB and SLM on the trailing edge line HK(i), in accordance with WGh1=dh1/dor. The degree of bulge WGv of the leading edge line VK(i+1) is defined as the largest ascertainable distance dv between the leading edge line VK(i+1) itself and the straight connecting line Lv of its points on SLM and HB relative to the meridional flow surface-orthogonal distance dor between HB and SLM on the trailing edge line HK(i), in accordance with WGv=dv/dor.

As shown on the left-hand and right-hand sides of FIG. 7a, it can be advantageous when, in the course between the mean meridional flow line SLM and the main flow path boundary HB, the leading edge line VK(i+1) of the rear blade (i+1) is provided with an overall larger bulge than the trailing edge line HK(i) of the front blade (i), characterized by degrees of bulge in accordance with WGv>WGh1. It can furthermore be advantageous here when WGv>=0.05+WGh1. It can also be advantageous here when the trailing edge line is provided with a small bulge overall, characterized by a degree of bulge of WGh1<=0.05. In a special case, HK(i) can be substantially or exactly linear.

It can furthermore be advantageous when the straight connecting line Lv of the points of the leading edge line VK(i+1) on SLM and HB are inclined more greatly relative to the meridional flow surface-orthogonal direction or than the straight connecting line Lh1 of the points of the trailing edge line HK(i) on SLM and HB.

It can be advantageous here when Lv and Lh1 are inclined in the opposite direction relative to the meridional flow surface-orthogonal direction or.

It can alternatively be advantageous when Lv and Lh1 are inclined in the opposite direction and within a tolerance of +/−2 degrees with the same angular amounts relative to the meridional flow surface-orthogonal direction or.

It can furthermore be favourable when both lines, the leading edge line VK(i+1) of the blade (i+1) and the trailing edge line HK(i) of the blade (i), are provided with the same number of curvature changes.

It can furthermore be favourable when both lines, the leading edge line VK(i+1) of the blade (i+1) and the trailing edge line HK(i) of the blade (i), are provided with a course without any curvature change. It is furthermore advantageous to have an arc-like course with curvatures unequal to zero with a consistently equal sign, see right-hand side of FIG. 7a.

It can alternatively be favourable when both lines, the leading edge line VK(i+1) of the blade (i+1) and the trailing edge line HK(i) of the blade (i), are provided with a course having a curvature change. It is furthermore advantageous to have an S-shaped course with 2 curved sections with curvatures having an opposite sign, see left-hand side of FIG. 7a.

It can alternatively be advantageous when one of the two lines, the leading edge line VK(i+1) of the blade (i+1) and the trailing edge line HK(i) of the blade (i), has a course without any curvature change, while the other of the two lines has a course with at least one curvature change, see left and right-hand sides of FIG. 7b.

It can furthermore be advantageous when the leading edge line VK(i+1) of the blade (i+1) has a course with two curvature changes, see left-hand side of FIG. 7b.

It can furthermore be advantageous when one of the two lines, the leading edge line VK(i+1) of the blade (i+1) and the trailing edge line HK(i) of the blade (i), has a course with at least one curvature change, where the point of a curvature change is provided closer to the main flow path boundary HB than to the mean flow line SLM or even within a distance of (0.25*dor) close to HB.

It is furthermore favourable when the leading edge line VK(i+1) runs locally in the area of a curvature change at a shallow angle of less than 30 degrees relative to the main flow path boundary HB, thereby forming a saddle-like line section which in the vicinity of HB allows VK(i+1) to extend locally far upstream.

It can be of further advantage when the lines VK(i+1) and HK(i) are of equal quality (e.g. both S-shaped with one curvature change) and have curvatures in the same direction, see left-hand side of FIG. 7a. It can be of particular advantage here when VK(i+1) and HK(i) run parallel within a tolerance of +/−3 degrees of the local inclination angle in an area on the SLM of at least (0.4*dor).

It can also be of further advantage when the lines VK(i+1) and HK(i) are of equal quality (e.g. both arc-like without any curvature change) but have curvatures in opposite directions, see right-hand side of FIG. 7a. It can be of particular advantage here when VK(i+1) and HK(i) have a mirror-inverted and identical course within a tolerance of +/−3 degrees of the local inclination angle.

It can furthermore be advantageous, when at least one of the lines VK(i+1) and HK(i) is designed concave upstream in at least one predominant part of its course between the mean flow line SLM and the main flow path boundary HB.

It can also be advantageous when at least one of the lines VK(i+1) and HK(i) is designed convex upstream in at least one predominant part of its course between the mean flow line SLM and the main flow path boundary HB.

It can furthermore be advantageous when the lines VK(i+1) and HK(i) on the mean flow line SLM have, within a tolerance of +/−2 degrees, the same local inclination relative to the meridional flow surface-orthogonal direction or.

It can furthermore be advantageous when at least one of the two lines VK(i+1) and HK(i) is inclined downstream in the direction of the main flow path boundary HB in an area adjoining the main flow path boundary HB.

It can furthermore be advantageous when at least one of the two lines VK(i+1) and HK(i) on the mean flow line SLM has a local inclination in an amount of less than 10 degrees relative to the meridional flow surface-orthogonal direction or.

It can furthermore be advantageous when at least one of the two lines VK(i+1) and HK(i) at the main flow path boundary HB has a local inclination in an amount of more than 20 degrees relative to the meridional flow surface-orthogonal direction or.

It can furthermore be advantageous when the two lines VK(i+1) and HK(i) at the main flow path boundary HB have local inclinations relative to the meridional flow surface-orthogonal direction or which are equal in their amounts within a tolerance of +/−3 degrees but have different signs.

It can furthermore be advantageous when the leading edge line VK(i+1) of the blade (i+1) is arranged in a predominant area adjoining the main flow path boundary HB, continuously increasing further upstream in the direction of HB, corresponding to continuously reduced coordinates s, see left-hand side of FIG. 7a.

It can be favourable here when the leading edge line VK(i+1) of the blade (i+1) is arranged completely in the direction of HB, continuously increasing further upstream, corresponding to continuously reduced coordinates s, see right-hand side of FIG. 7a.

It can furthermore be advantageous when the leading edge line VK(i+1) of the blade (i+1) in an area at the main flow path boundary HB has in the direction of HB a course with continuously increasing concave curvature upstream, see right-hand side of FIG. 7b.

It can furthermore be advantageous when the leading edge line VK(i+1) and the trailing edge line HK(i) touch or converge in at least one point, see right-hand side of FIG. 7c.

It can furthermore be advantageous when the leading edge line VK(i+1) and the trailing edge line HK(i) intersect in at least one point between SLM and HB.

In addition to the interference parameter "secondary passage width", the individual course of the trailing edge line HK(i) and of the suction-side projection line PLSS(i+1) is also of crucial importance for favourably influencing the three-dimensional flow in the interference area of the blade rows (i) and (i+1).

FIG. 8a shows as bold unbroken lines the trailing edge of the front blade HK(i) and the suction-side projection line PLSS(i+1) of the rear blade (i+1) in the area between the main flow path boundary HB and the mean meridional flow line SLM defined with half the blade height, in the q-or plane (view A-A in FIG. 4b). The suction side SS(i) and the pressure side DS(i) of the front blade are also marked. The degree of bulge WGh2 of the trailing edge HK(i) is defined as the largest ascertainable distance dh2 between the trailing edge HK(i) itself and the straight connecting line Lh2 of its points on SLM and HB relative to the meridional flow surface-orthogonal distance dor on HK(i) between HB and SLM, in accordance with WGh2=dh2/dor. The degree of bulge WGp of the suction-side projection line PLSS(i+1) is defined as the largest ascertainable distance dp between the projection line PLSS(i+1) itself and the straight connecting line Lp of its points on SLM and HB relative to the meridional flow surface-orthogonal distance dor between HB and SLM, in accordance with WGp=dp/dor.

As shown on the left-hand and right-hand sides of FIG. 8a, it can be advantageous when, in the course between the mean meridional flow line SLM and the main flow path boundary HB, the trailing edge line HK(i) of the front blade (i) is provided with an overall larger bulge than the suction-side projection line PLSS(i+1) of the rear blade (i+1), characterized by degrees of bulge in accordance with WGh2>WGp. It can furthermore be advantageous here when WGh2>=0.05+WGp applies. It can also be advantageous here when the suction-side projection line PLSS(i+1) is provided with a small bulge overall, characterized by a degree of bulge of WGp<=0.05. In a special case, PLSS(i+1) can be substantially or exactly linear (see right-hand side of FIG. 8a).

It can furthermore be advantageous when the straight connecting line Lh2 of the points of the trailing edge line HK(i) on SLM and HB is inclined more greatly relative to the meridional flow surface-orthogonal direction or than the straight connecting line Lp of the points of the suction-side projection line PLSS(i+1) on SLM and HB.

It can be advantageous here when Lh2 and Lp are inclined in the opposite direction relative to the meridional flow surface-orthogonal direction or.

It can alternatively be advantageous when Lh2 and Lp are inclined in the opposite direction and within a tolerance of +/−2 degrees with equal angular amounts relative to the meridional flow surface-orthogonal direction or.

It can furthermore be favourable when both lines, the trailing edge line HK(i) of the blade (i) and the suction-side projection line PLSS(i+1) of the blade (i+1), are provided with a course without any curvature change. It is furthermore advantageous to have an arc-like course with curvatures having a consistently equal sign, see left-hand side of FIG. 8a.

It can alternatively be favourable when both lines, the trailing edge line HK(i) of the blade (i) and the suction-side projection line PLSS(i+1) of the blade (i+1), are provided with a course having a curvature change. It is furthermore advantageous to have an S-shaped course with 2 curved sections with curvatures having an opposite sign, see left-hand side of FIG. 8b.

It can alternatively be favourable when one of the two lines, the trailing edge line HK(i) of the front blade (i) and the suction-side projection line PLSS(i+1) of the rear blade (i+1), has at least one curvature change more than the other of the two lines, when for example one of the two lines has a course without any curvature change while the other has a course with a curvature change, see right-hand side of FIG. 8b.

It can be of further advantage when the lines HK(i) and PLSS(i+1) are of equal quality and have curvatures in the same directions, see left-hand side of FIG. 8b.

It can also be of further advantage when the lines HK(i) and PLSS(i+1) are of equal quality but have curvatures in opposite directions, see left-hand side of FIG. 8c. It can be of particular advantage here when HK(i) and PLSS(i+1) have a mirror-inverted and identical course within a tolerance of +/−3 degrees of the local inclination angle, see right-hand side of FIG. 8c.

It can furthermore be advantageous when at least one of the lines HK(i) and PLSS(i+1) is designed concave on the suction side in at least one predominant part of its course between the mean flow line SLM and the main flow path boundary HB. It is particularly advantageous when the trailing edge line HK(i) in at least one predominant part of its course is designed concave on the suction side.

It can furthermore be advantageous when the lines HK(i) and PLSS(i+1) on the mean flow line SLM have, within a tolerance of +/−2 degrees, the same local inclination relative to the meridional flow surface-orthogonal direction or.

It can furthermore be advantageous when at least one of the two lines HK(i) and PLSS(i+1) on the mean flow line SLM has a local inclination in an amount of less than 10 degrees relative to the meridional flow surface-orthogonal direction or.

It can furthermore be advantageous when at least one of the two lines HK(i) and PLSS(i+1) is inclined in an area adjoining the main flow path boundary HB on the pressure side in the direction of the main flow path boundary HB.

It can furthermore be advantageous when at least one of the two lines HK(i) and PLSS(i+1) at the main flow path boundary HB has a local inclination in an amount of more than 20 degrees relative to the meridional flow surface-orthogonal direction or.

It can furthermore be advantageous when the two lines HK(i) and PLSS(i+1) at the main flow path boundary HB have local inclinations relative to the meridional flow surface-orthogonal direction or which are equal in their amounts within a tolerance of +/−3 degrees but have different signs.

The length-width ratio LWV=v/w of the blade row group can be used as a measure for the intensity of the flow-mechanical interference between the front and rear member blade rows.

In the mean meridional flow line section SLM, where the flow behaviour of the blade row group is free from influences of the main flow path boundaries HB, values of LWV<=2 are advantageous.

It can furthermore be advantageous here when the value of LWV is fixed within a range in accordance with: 0.5<=LWVSLM<=1.5. It is furthermore advantageous when LWVSLM is fixed at a value of 0.75 within a tolerance of +/−0.25. With structural restrictions it can be advantageous when LWVSLM is fixed at a value of 1.5 within a tolerance of +/−0.25.

The following provides stipulations for distribution in the direction of the main flow path boundaries. To do so, the relative length-width ratio LWV' is used.

It can be advantageous when LWV' in a predominant area adjoining the mean meridional flow line SLM is constant within a tolerance of +/−0.25. It can be advantageous here when LWV' assumes a value of 1.5 within a tolerance of +/−0.25.

It can furthermore be advantageous when LWV increases continuously or even progressively in the direction of HB in an area adjoining the main flow path boundary HB.

It can furthermore be advantageous when LWV increases continuously or even progressively in the direction of HB in the entire area between SLM and HB.

It can furthermore be advantageous when LWV' at HB assumes a value of 1.5 within a tolerance of +/−0.25.

When the blade row group in the meridional plane (x-r) is finally considered, the leading edge line VK(i+1) of the rear blade and the trailing edge line HK(i) of the front blade can, depending on the specific blade shaping, display very different forms. It is thus possible in some circumstances for VK(i+1) to be upstream in front of HK(i) and have a meridional meshing e. The meridional meshing e is measured parallel to the direction of the meridional coordinate m from the leading edge of a blade (i+1) to the trailing edge of a blade (i) and has a positive sign relative to the meridional flow direction. If VK(i+1) is downstream of HK(i), a meridional meshing e is counted negatively.

It can be advantageous when, in an area adjoining the main flow path boundary HB, the meridional meshing e increases continuously or even progressively in the direction of HB. It can be favourable here when the meridional meshing changes the sign in the middle (within a tolerance of +/−0.03*dor) between the mean meridional flow line SLM and the main flow path boundary HB. Alternatively it can be favourable here when the meridional meshing at HB remains less than or equal to zero.

A particularly favourable flow behaviour in the blade group in accordance with the invention results when, in the area of the blade ends at hub and casing adjoining the respective main flow path boundary, at least one of the features described in the above text is provided. It is particularly advantageous here when, in the area of the hub and of the casing, at least one identical feature or even completely identical features are provided.

The invention claimed is:

1. A blade row group arrangeable in a main flow path of a fluid-flow machine, comprising:
   N adjacent member blade rows firmly arranged relative to each other in both a meridional direction (m) and a circumferential direction (u), where N is ≥2 and (i) designates a running index with values between 1 and N, the N adjacent member blade rows including a front member blade row with front blades (i) each having a leading edge VK(i) and a trailing edge HK(i), and a rear member blade row with rear blades (i+1) each having a leading edge VK(i+1) and a trailing edge HK(i+1),
   where the blade row group has two main flow path boundaries (HB),
   where, in at least one area of a blade height adjoining one of the main flow path boundaries (HB), between a front section of a suction side of a rear blade (i+1) in the rear member blade row and a rear section of a pressure side of a front blade (i) in the front member blade row, a secondary passage (NP) is provided which guides the flow locally,
   where, in each meridional flow line section (m-u plane) through the blade row group:
   a chord Se(i) of the front blade (i) and a chord Se(i+1) of the rear blade (i+1) is defined as a tangent lying on a respective profile on the pressure side,
   a profile depth I(i) of the front blade (i) and the profile depth I(i+1) of the rear blade (i+1) are shown in a direction of the respective chord Se(i), Se(i+1),
   a front blade spacing t(i) is defined as a distance in the circumferential direction (u) between two adjacent blades of the front member blade row (i) in a plane defined by the trailing edges of the two adjacent blades,
   a front blade stagger angle lambda(i) and a rear blade stagger angle lambda(i+1) being defined as angles of inclination of the respective chord Se(i), Se(i+1), relative to the meridional direction (m),
   a mean stagger angle lambdam is defined as a mean value of the stagger angles lambda(i) and lambda(i+1) in accordance with lambdam=(lambda(i)+lambda(i+1))/2,
where, in each trailing edge point H of the front blade (i) an auxiliary coordinate system having a first, a second and a third coordinate direction (s, q, or) is provided, with the first coordinate direction (s) facing downstream at the angle lambdam against the meridional direction (m), the second coordinate direction (q), perpendicular to the first coordinate direction (s), facing away from the pressure side of the front blade (i), and the third coordinate direction (or) being perpendicular to the first coordinate direction (s) and to the second coordinate direction (q),
where a secondary passage length v is defined as a distance between the trailing edge point H of the front blade (i) and a leading edge point V of the rear blade (i+1) in a direction of the first coordinate direction (s), and vSLM identifies a value on a mean meridional flow line (SLM),
where a standardized secondary passage length is defined in accordance with vn=v/l(i) and vnSLM identifies a value on the mean meridional flow line (SLM),
where a relative secondary passage length v' is defined in accordance with v'=(v−vSLM)/l(i),
where a secondary passage width w is defined as a distance between the trailing edge point H of the front blade (i) and a point P on the suction side of the rear blade (i+1), where the point P results as an intersection point of an orthogonal (O) erected in the trailing edge point H of the front blade (i) in the first coordinate direction (s) with the suction side of the rear blade (i+1), where the orthogonal (O) is oriented against the second coordinate direction (q) leading away from the pressure side of the front blade (i), where a connection of all points P determined along the blade height in various meridional flow line sections results in a suction-side projection line PLSS(i+1) of the rear blade (i+1),
where wSLM identifies a value of w on the mean meridional flow line (SLM),
where a standardized secondary passage width is defined in accordance with wn=w/(t(i) cos lambdam), and wnSLM identifies a value of wn on the mean meridional flow line (SLM), and
where a relative secondary passage width w' is defined in accordance with w'=(w−wSLM)/(t(i) cos lambdam),
where a relative secondary passage length v' and the relative secondary passage width w' each increase towards one of the main flow path boundaries (HB) at least in one part of ante area between the mean meridional flow line (SLM) and the one of the main flow path boundaries (HB), where the values for the relative secondary passage length v' and the relative secondary passage width w' are, on at least one of the main flow path boundaries (HB), greater than on the mean meridional flow line (SLM) in a main flow path center, where, in a view directed upstream and parallel to the first coordinate direction (s) in the mean meridional flow line blade section, a degree of bulge WGh2 of the trailing edge HK(i) of the front blade (i) in the area between the mean meridional flow line (SLM) and at least one of the main flow path boundaries (HB) is greater than a degree of bulge WGp of the suction-side projection line PLSS(i+1) of the rear blade (i+1), where a degree of bulge WGh2 of the trailing edge HK(i) is defined as a greatest ascertainable distance (dh2) between the trailing edge HK(i) and a straight connecting line (Lh2) of points of the trailing edge HK(i) on the mean meridional flow line (SLM) and at one of the main flow path boundaries (HB) relative to a meridional flow surface-orthogonal distance (dor) on the trailing edge HK(i) between the one of the main flow path boundaries (HB) and the mean meridional flow line (SLM), in accordance with WGh2=dh2/dor, and the degree of bulge (WGp) of the suction-side projection line PLSS(i+1) is defined as a greatest ascertainable distance (dp) between the projection line PLSS(i+1) and a straight connecting line (Lp) of points of the projection line PLSS(i+1) on the mean meridional flow line (SLM) and at one of the main flow path boundaries (HB) relative to the meridional flow surface-orthogonal distance (dor) between the one of the main flow path boundaries (HB) and the mean meridional flow line (SLM), in accordance with WGp=dp/dor.

2. The blade row group in accordance with claim 1, wherein the relative secondary passage length v' in an area adjoining one of the main flow path boundaries (HB) rises continuously towards the one of the main flow path boundaries (HB).

3. The blade row group in accordance with claim 1, wherein the relative secondary passage length v' in an area adjoining one of the main flow path boundaries (HB) remains constant.

4. The blade row group in accordance with claim 1, wherein the relative secondary passage length v' in an area adjoining one of the main flow path boundaries (HB) decreases towards the one of the main flow path boundaries (HB).

5. The blade row group in accordance with claim 1, wherein a distribution of the relative secondary passage length v' over a main flow path penetration (HE) is completely below an upper limit curve v'o and completely above a lower limit curve v'u, where the upper limit curve v'o is provided by:

$$v'o = -6E\text{-}08(HE)^{}4 + 4E\text{-}07(HE)^{}3 + 0.0004(HE)^{**}2 - 0.0224(HE) + 0.45$$

and the lower limit curve is provided by:

$$v'u = 5E\text{-}08(HE)^{}4 - 5E\text{-}06(HE)^{}3 + 0.0003(HE)^{**}2 - 0.0111(HE) + 0.05.$$

6. The blade row group in accordance with claim 1, wherein the relative secondary passage width w' in an area adjoining one of the main flow path boundaries (HB) rises continuously towards the one of the main flow path boundaries (HB).

7. The blade row group in accordance with claim 1, wherein the relative secondary passage width w' in an area adjoining one of the main flow path boundaries (HB) remains constant.

8. The blade row group in accordance with claim 1, wherein the relative secondary passage width w' in an area adjoining one of the main flow path boundaries (HB) decreases towards the one of the main flow path boundaries (HB).

9. The blade row group in accordance with claim 1, wherein a distribution of the relative secondary passage width w' over a main flow path penetration (HE) is completely below an upper limit curve w'o and completely above a lower limit curve w'u, where the upper limit curve w'o is provided by:

$$w'o = -1E\text{-}07(HE)^{}4 + 7E\text{-}06(HE)^{}3 + 0.0001(HE)^{**}2 - 0.0159(HE) + 0.35$$

and the lower limit curve w'u is provided by:

$$w'u = 8E\text{-}08(HE)^{}4 - 8E\text{-}06(HE)^{}3 + 0.0004(HE)^{**}2 - 0.0108(HE) + 0.05.$$

10. The blade row group in accordance with claim 1, wherein—as a measure for an intensity of a flow-mechanical interference between a front member blade (i) and a rear member blade (i+1)—a length-width ratio LWV of the secondary passage NP formed between them is used, with the length-width ratio being defined as LWV=v/w, the value of LWV in the mean meridional flow line section SLM being identified with LWVSLM, and the relative length-width ratio being defined in accordance with LWV'=LWV−LWVSLM, where the relative length-width ratio LWV' in a predominant area adjoining the mean meridional flow line section SLM is constant within a tolerance of +/−0.25.

11. The blade row group in accordance with claim 1, wherein a relative length-width ratio LWV' increases continuously in a direction of one of the main flow path boundaries (HB) in an area adjoining the one of the main flow path boundaries (HB).

12. The blade row group in accordance with claim 1, wherein in a view tangential to a mean meridional flow section and perpendicular to a first coordinate direction (s) in the mean meridional flow line section SLM, the leading edge VK(i+1) of the rear blade (i+1) in the area between the mean meridional flow line (SLM) and one of the main flow path boundaries (HB) has a greater degree of bulge than the trailing edge HK(i) of the front blade (i), in accordance with WGv>WGh1, where a degree of bulge WGh1 of the trailing edge HK(i) is defined as a greatest ascertainable distance dh1 between the trailing edge HK(i) and a straight line Lh1 connecting points of the trailing edge HK(i) on SLM and HB relative to the meridional flow surface-orthogonal distance dor between HB and SLM on the trailing edge HK(i), in accordance with WGh1=dh1/dor, and a degree of bulge WGv of the leading edge VK(i+1) is defined as a greatest ascertainable distance dv between the leading edge VK(i+1) and a straight line Lv connecting points of the leading edge VK(i+1) on SLM and HB relative to the meridional flow surface-orthogonal distance dor between HB and SLM on the trailing edge HK(i), in accordance with WGv=dv/dor.

13. The blade row group in accordance with claim 1, wherein a straight line Lv connecting points of the leading edge VK(i+1) on SLM and HB has a greater angles relative to a meridional flow surface-orthogonal direction than a straight line Lh1 connecting points of the trailing edge HK(i) on SLM and HB.

14. The blade row group in accordance with claim 1, wherein one of the leading edge VK(i+1) of the rear blade (i+1) and the trailing edge HK(i) of the front blade (i) has at least one curvature change more than the other of the leading edge VK(i+1) of the rear blade (i+1) and the trailing edge HK(i) of the front blade (i).

15. The blade row group in accordance with claim 1, wherein the leading edge VK(i+1) of the rear blade (i+1) includes two curvature changes.

16. The blade row group in accordance with claim 1, wherein a straight line Lh2 connecting points of the trailing edge HK(i) on SLM and HB has a greater angles relative to a meridional flow surface-orthogonal direction than a straight line Lp connecting points of the suction-side projection line PLSS(i+1) on SLM and HB.

17. The blade row group in accordance with claim 1, wherein both the trailing edge HK(i) of the front blade (i) and the suction-side projection line PLSS(i+1) of the rear blade (i+1) include a same number of curvature changes.

18. The blade row group in accordance with claim 1, wherein the trailing edge HK(i) of the front blade (i) and the suction-side projection line PLSS(i+1) of the rear blade (i+1) have curvatures in opposite directions.

19. The blade row group in accordance with claim 1, wherein the degree of bulge WGh2 in the area between the mean meridional flow line (SLM) and each of the main flow path boundaries (HB) is greater than the degree of bulge WGp.

* * * * *